US012134350B2

(12) United States Patent
Harris et al.

(10) Patent No.: US 12,134,350 B2
(45) Date of Patent: Nov. 5, 2024

(54) REAR VIEW DEVICE WITH ACTUATOR AND GASKET SEALING HEAD MOVER

(71) Applicant: MOTHERSON INNOVATIONS COMPANY LIMITED, London (GB)

(72) Inventors: Tom Harris, Portchester (GB); Stephen Beecher, Portchester (GB); David Kershaw, Portchester (GB); Gareth Aspden, Portchester (GB); Levente Kurti, Portchester (GB); Warwick Jones, Portchester (GB); Dong Myeong Park, Portchester (GB); Levente Acs, Stuttgart (DE); Thorsten Staiger, Stuttgart (DE); Zoltàn Huszar, Mosonmagyaróvár (HU); Andrew Lettis, Portchester (GB); Callum Scott-Collins, Portchester (GB); Graham Rehill, Portchester (GB); Andreas Herrmann, Stuttgart (DE); Arne Schmierer, Stuttgart (DE); Simon David Field, Lonsdale (AU); Francis Charlet, Dammarie les Lys (FR)

(73) Assignee: Motherson Innovations Company Limited, London (GB)

( * ) Notice: Subject to any disclaimer, the term of this patent is extended or adjusted under 35 U.S.C. 154(b) by 462 days.

(21) Appl. No.: 17/587,931

(22) Filed: Jan. 28, 2022

(65) Prior Publication Data

US 2022/0176878 A1    Jun. 9, 2022

Related U.S. Application Data

(63) Continuation-in-part of application No. PCT/EP2021/062219, filed on May 7, 2021, and a
(Continued)

(51) Int. Cl.
*B60R 1/06*     (2006.01)

(52) U.S. Cl.
CPC ................................ *B60R 1/06* (2013.01)

(58) Field of Classification Search
CPC . B60R 2001/1253; B60R 1/06; B60Q 1/0023; B60Q 1/2615; B60Q 1/06
See application file for complete search history.

(56) References Cited

U.S. PATENT DOCUMENTS

| | | | |
|---|---|---|---|
| 6,685,864 B2 * | 2/2004 | Bingle | B60R 1/072 264/254 |
| 2002/0047386 A1 * | 4/2002 | Bingle | H02K 5/24 310/89 |

(Continued)

FOREIGN PATENT DOCUMENTS

| | | |
|---|---|---|
| DE | 102018218499 B4 | 11/2021 |
| JP | 2014 061808 A | 4/2014 |

(Continued)

OTHER PUBLICATIONS

International Search Report dated Dec. 11, 2018 of International application No. PCT/EP2018/079886.
(Continued)

*Primary Examiner* — Gilbert Y Lee
(74) *Attorney, Agent, or Firm* — Jones Day

(57) ABSTRACT

The present disclosure relates to a rear view device for a vehicle with one or more gaskets preventing water or other contaminants from entering the device between components, while allowing the components to move in relation to one another. In embodiments, the rear view device comprises a base adapted to be mounted to a side of the vehicle, a head for supporting at least one means for providing a rearward field of view disposed at a second attachment end of the base, an actuator connected to the second end of the base, and a shroud attached to the actuator, wherein the actuator may rotate the head in relation to the base. In embodiment, a foot gasket is attached to a foot of the base and includes
(Continued)

a first lip portion that extends towards the shroud in a vertical direction, and a second soft lip portion that contacts the shroud in a horizontal direction. In embodiments, a head gasket includes a soft lip portion comprising a first end making contact with a face of the shroud, and a hard portion comprising an attachment to a second end of the soft lip portion, wherein the head gasket extends at an angle from the shroud.

15 Claims, 40 Drawing Sheets

Related U.S. Application Data continuation-in-part of application No. 16/757,834, filed as application No. PCT/EP2018/079886 on Oct. 31, 2018, now Pat. No. 11,273,764, which is a continuation-in-part of application No. PCT/EP2018/067842, filed on Jul. 2, 2018, and a continuation-in-part of application No. 15/800,413, filed on Nov. 1, 2017, now abandoned, which is a continuation-in-part of application No. 15/603,751, filed on May 24, 2017, now Pat. No. 10,759,345, and a continuation-in-part of application No. 15/607,894, filed on May 30, 2017, now Pat. No. 10,744,947, which is a continuation-in-part of application No. 15/000,754, filed on Jan. 19, 2016, now Pat. No. 9,796,333, which is a continuation-in-part of application No. 14/022,896, filed on Sep. 10, 2013, now abandoned, said application No. 15/607,894 is a continuation-in-part of application No. 15/439,188, filed on Feb. 22, 2017, now Pat. No. 10,703,281, which is a continuation-in-part of application No. 14/936,024, filed on Nov. 9, 2015, now Pat. No. 9,656,601, which is a continuation-in-part of application No. 14/374,376, filed as application No. PCT/AU2013/000047 on Jan. 24, 2013, now Pat. No. 9,181,616, application No. 17/587,931 is a continuation-in-part of application No. 16/459,051, filed on Jul. 1, 2019, now Pat. No. 11,479,164.

(60) Provisional application No. 63/021,168, filed on May 7, 2020, provisional application No. 63/124,987, filed on Dec. 14, 2020.

(56) References Cited

U.S. PATENT DOCUMENTS

| | | |
|---|---|---|
| 2011/0194302 A1 | 8/2011 | Kishimoto et al. |
| 2015/0138658 A1 | 5/2015 | Nishimura et al. |
| 2018/0257571 A1 | 9/2018 | De Wind et al. |
| 2019/0039522 A1 | 2/2019 | Foote et al. |

FOREIGN PATENT DOCUMENTS

| | | |
|---|---|---|
| JP | 2016 037109 A | 3/2016 |
| WO | WO 01/96149 A1 | 12/2001 |

OTHER PUBLICATIONS

Written Opinion dated Dec. 11, 2018 of International application No. PCT/EP2018/079886.

* cited by examiner

REAR VIEW DEVICE WITH ACTUATOR AND GASKET SEALING HEAD MOVER

CROSS-REFERENCE TO RELATED APPLICATIONS

This application is a continuation-in-part of International Patent Application No. PCT/EP2021/062219, which claims priority to both U.S. Provisional Application No. 63/021,168, filed on May 7, 2020, and U.S. Provisional Application No. 63/124,987, filed on Dec. 14, 2020.

This application is also a continuation-in-part of U.S. patent application Ser. No. 16/757,834, filed on Apr. 21, 2020, which is a National Stage Entry of International Patent Application No. PCT/EP2018/079886, filed Oct. 31, 2018, which claims the benefit of priority to International Patent Application No. PCT/EP2018/067842, filed Jul. 2, 2018; International Patent Application No. PCT/EP2018/079886 also claims the benefit of priority to U.S. patent application Ser. No. 15/800,413, filed Nov. 1, 2017, which is a continuation-in-part of U.S. patent application Ser. No. 15/603,751, filed May 24, 2017, which claims the benefit of foreign priority to European Patent Application No. 16198759.9, filed Nov. 14, 2016; U.S. patent application Ser. No. 15/800,413 is also a continuation-in-part of U.S. patent application Ser. No. 15/607,894, filed May 30, 2017, which is a continuation-in-part of U.S. patent application Ser. No. 15/000,754, filed Jan. 19, 2016, which is a continuation-in-part of U.S. patent application Ser. No. 14/022,896, filed Sep. 10, 2013, which claims the benefit of foreign priority to German Patent Application No. 102012108480.7, filed Sep. 11, 2012; U.S. patent application Ser. No. 15/607,894 is also a continuation-in-part of U.S. patent application Ser. No. 15/439,188, filed Feb. 22, 2017, which is a continuation-in-part of U.S. patent application Ser. No. 14/936,024, filed Nov. 9, 2015, which is a continuation-in-part of U.S. patent application Ser. No. 14/374,376, filed Jul. 24, 2014 and now issued as U.S. Pat. No. 9,181,616, which is a national stage entry of International Patent Application No. PCT/AU2013/000047, filed Jan. 24, 2013, which claims the benefit of foreign priority to Australian Patent Application No. 2012900267, filed Jan. 24, 2012, and claims the benefit of foreign priority to European Patent Application No. 16198759.9, filed Nov. 14, 2016; and which claims the benefit of foreign priority to German Patent Application No. 102018116008.9, filed Jul. 2, 2018, and claims the benefit of foreign priority to German Patent Application No. 102018116011.9, filed Jul. 2, 2018, and claims the benefit of foreign priority to European Patent Application No. 18198678.7, filed Oct. 4, 2018.

This application is also a continuation-in-part of U.S. patent application Ser. No. 16/459,051, which claims the benefit of foreign priority to German Patent Application No. DE 10 2018 115 011.9, filed Jul. 2, 2019.

Each of the above-referenced priority applications are incorporated herein in their entirety.

FIELD

The present disclosure relates to a rear view device for a vehicle, said rear view device comprising an actuator and a gasket sealing head mover for said rear view device. It also relates to a vehicle with at least one such rear view device.

BACKGROUND

The statements in this section merely provide background information related to the present disclosure and may not constitute prior art.

Vehicles are required to have a rear view system that is operable to provide a driver of the vehicle a rearward field of view. The rear view system typically includes one or more components that are required to be actuated relative to the vehicle body along a first axis, such components may include mirrors or cameras. As an example, the actuation of components along a first axis may provide the driver of the vehicle the ability to fine tune the rearward field of view provided by the rear view system.

Further, some rear view systems provide actuation of one or more components along a second axis, such components may include mirrors or cameras. As an example, the actuation of components along a secondary axis allows the components to be stored closer to the vehicle body in certain conditions. Generally, actuation of components in a rear view system along a secondary axis is achieved using a secondary actuator.

Electromechanical actuators are typically used to rotate the components relative to the vehicle body. However, existing electromechanical actuators may be noisy, heavy, and large in size and often require high strength metallic parts (e.g., gearing) due to high shock loads acting on a gear train during impacts, thereby making the actuators heavier and costlier.

The use of a single actuator to provide adjustment of components along multiple axes allows for adjustment along a second axis which can reduce rear view system design cost and complexity.

With use of electronics to actuate components of the rear view device, it is important to provide a seal around such elements to prevent water, dirt, or other contaminants from entering the assembly, while providing the assembly with the ability to move with minimal resistance.

SUMMARY

Generally, the present disclosure provides a rear view device with a gasket comprising a base that provides a first attachment end for attachment to the side of a vehicle and a second attachment end for an actuator with an attached shroud. The gasket comprises a soft lip extending horizontally from a foot of the base to make contact with the shroud, wherein the gasket maintains contact between the base and the shroud while allowing the actuator to rotate a head of the rearview device in relation to the base. In some embodiments, a second gasket may provide an additional seal by contacting the face of the shroud at an angle with an additional soft lip attached to a hard component. This sealing configuration provides a sealed enclosure that allows movement of the base by actuators without the need for a large amount of current draw to the actuators.

The rear view device additionally comprises a mirror head comprising an actuator moving the entire mirror head. For that purpose, a tilt axle of the actuator is adapted to be fixedly attached to the case lower and/or the case frame, and/or a hinge of the actuator is adapted to be engaged by a complementary hinge of the case frame. In addition or as alternative, the actuator is associated with a shroud for attachment of the actuator such that the mirror head creates a seal. An additional seal is created by the attachment of the mirror head to the mirror base.

It should be noted that the features set out individually in the following description can be combined with each other in any technically advantageous manner and set out other forms of the present disclosure. It should be understood, however, that the disclosure is not limited to the precise arrangements and instrumentalities shown. The accompanying drawings, which are incorporated in and constitute a part of this specification, illustrate an implementation of system, apparatuses, and methods consistent with the present description and, together with the description, serve to explain advantages and principles consistent with the disclosure. The figures are not necessarily drawn to scale. Like numbers used in the figures refer to like components. However, it will be understood that the use of a number to refer to a component in a given figure is not intended to limit the component in another figure labelled with the same number. The description further characterizes and specifies the present disclosure in particular in connection with the Figures.

DRAWINGS

In order that the disclosure may be well understood, there will now be described various forms thereof, given by way of example, reference being made to the accompanying drawings, in which.

DETAILED DESCRIPTION

Figure 1:
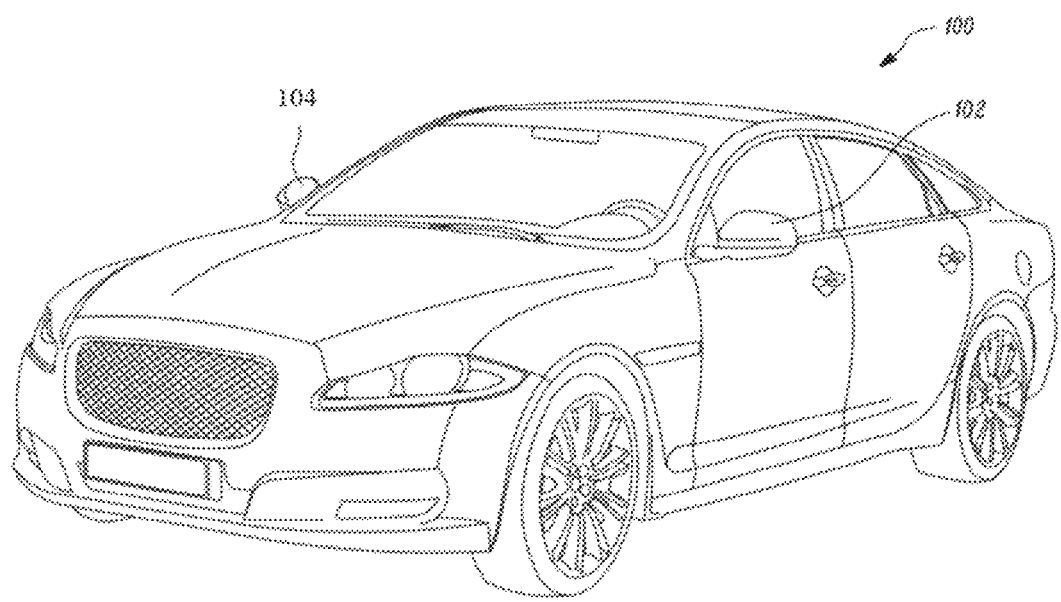
FIG. 1 illustrates a vehicle in accordance with aspects of the present disclosure.

The following description is merely exemplary in nature and is not intended to limit the present disclosure, application, or uses. It should be understood that throughout the drawings, corresponding reference numerals indicate like or corresponding parts and features.

FIG. 1 illustrates a vehicle 100 in accordance with aspects of the present disclosure.

As shown in FIG. 1, the vehicle 100 includes a rear view device 102, 104 on each of its sides. Although the vehicle 100 is illustrated as a passenger car, the vehicle 100 may be any other type of vehicle, non-limiting examples of the vehicle 100 include a truck, off-road vehicle, bus, motorcycle, aircraft, tram, locomotive, or heavy-duty vehicle.

In FIG. 1, the rear view mirror devices s 102, 104 are illustrated as side view mirrors. In alternative variations, the rear view devices 102, 104 may be implemented as camera systems. The rear view devices 102, 104 are arranged on the vehicle 100 such that they may be adjusted to provide a view rearward of the vehicle to a driver.

The operation of the rear view devices 102, 104 will now be further described with additional reference to FIGS. 2A-3C. While the following description will refer to the rear view device 104, it will be appreciated that the rear view device 104 has an analogue structure.

Figures 2A, 2B:
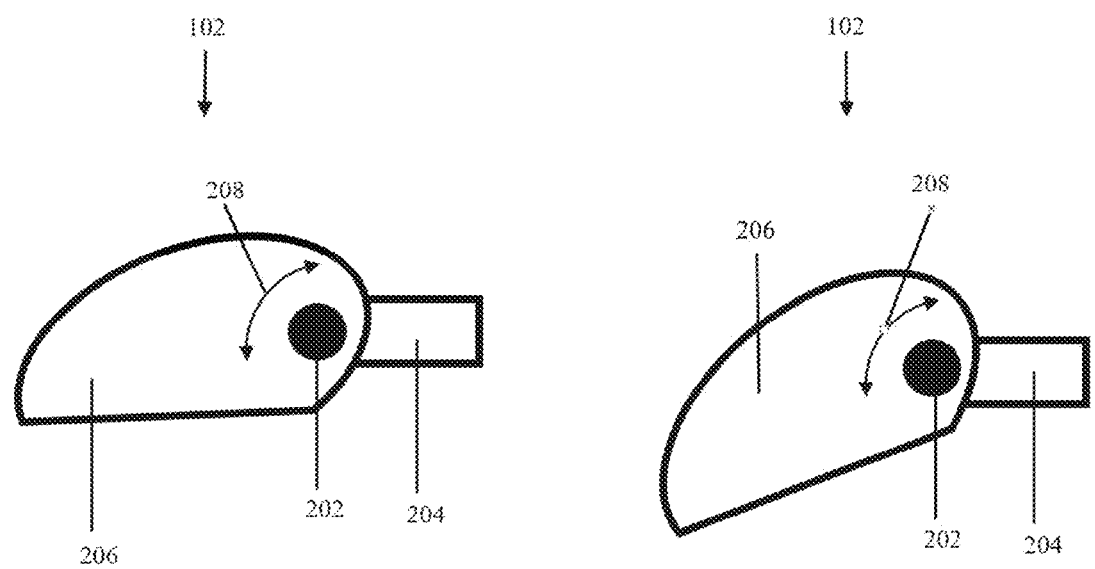
FIG. 2A illustrates a top down view of a rear view device with a mirror head in a drive position in accordance with aspects of the present disclosure.
FIG. 2B illustrates a top down view of the rear view device with the mirror head in a folded position in accordance with aspects of the present disclosure.

FIGS. 2A-B show a top down view of the rear view device 102 in accordance with aspects of the present disclosure.

As shown in FIGS. 2A-B the rear view device 102 includes an axis 202, a mirror base 204, and a mirror head 206. In FIG. 2A, the rear view device 102 can be seen in a top down view with the mirror head 206 in the drive position. When actuated in a first direction relative to the axis 202 as shown by line 208, movement is imparted to the mirror head 206 to rotate it around the axis 202 to a stored position as shown in FIG. 2B. Additionally, when actuated in a second direction relative to the axis 202 as shown by line 208, movement can be imparted to the mirror head 206 when in the stored position shown in FIG. 2B to rotate it back to the drive position shown in FIG. 2A.

The actuation of the mirror head 206 about the axis 202 can be done from any position to move the mirror head 206 to any other position about the axis 202. For example, the mirror head 206 may start in the stored position as shown in FIG. 2B and then be actuated in the second direction about the axis 202 to move the mirror head 206 to the drive position. The mirror head 206 may be adjusted to any position between the drive position shown in FIG. 2A and the stored position shown in FIG. 2B.

Additionally, when the mirror head 206 is in the drive position as shown in FIG. 2A, actuation can be performed such that it moves the mirror head 206 to adjust the rearward field of view of the driver of the vehicle 100. The movement required to adjust the mirror head 206 such that it adjusts the rearward field of view of the driver of the vehicle 100 is less than that required to move the mirror head 206 from the drive position to the stored position or from the stored position to the drive position.

Figure 3A:
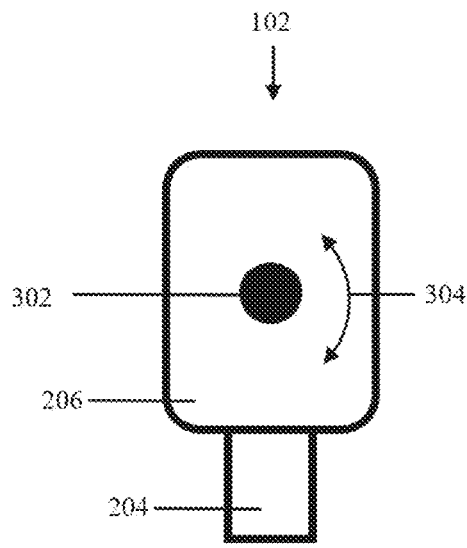
FIG. 3A illustrates a side view of the rear view device with the mirror head in a nominal position in accordance with aspects of the present disclosure.
Figure 3B:
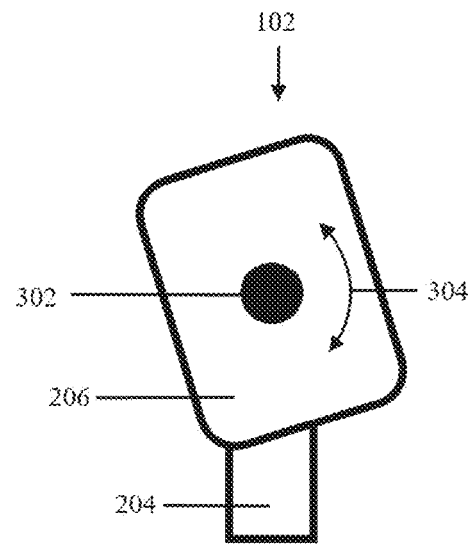
FIG. 3B illustrates a side view of the rear view device with the mirror head tilted upwards in accordance with aspects of the present disclosure.
Figure 3C:
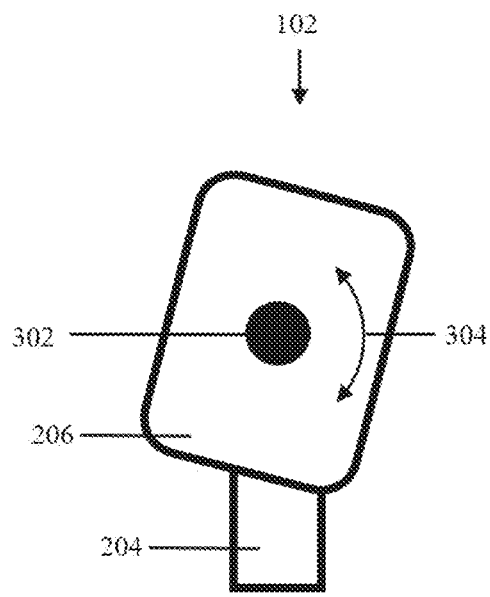
FIG. 3C illustrates a side view of the rear view device with the mirror head tilted downwards in accordance with aspects of the present disclosure.

FIGS. 3A-C show a side view of the rear view device 102 in accordance with aspects of the present disclosure.

As shown in the FIGS. 3A-C, the rear view device 102 includes the mirror base 204, the mirror head 206, and an axis 302. In FIG. 3A, the rear view device 102 can be seen in a side view with the mirror head 206 in a nominal position. When actuated in a first direction as shown by line 304, movement is imparted to the mirror head 206 such that it is tilted upwards to the position shown in FIG. 3B. When actuated in a second direction as shown by line 304, movement is imparted to the mirror head 206 such that it is tiled downward to the position shown in FIG. 3C.

The actuation of the mirror head about the axis 302 can be done from any position to move the mirror head 206 to any other position about the axis 302. For example, the mirror head may start tilted upwards as shown in FIG. 3B and then actuated in the second direction to tilt the mirror head 206 downwards. While being tilted downwards, actuation can be stopped to adjust the mirror head 206 to the nominal position shown in FIG. 3A or continued to adjust the mirror head 206 downwards until it reaches the position shown in FIG. 3C. Further, the mirror head 206 can be tilted to any position between that shown in FIG. 3B and FIG. 3C.

The description and the discussion of the figures that follows is in regards to the rear view device 102, however it should be noted that device 104 functions in a similar fashion.

Figure 4A:
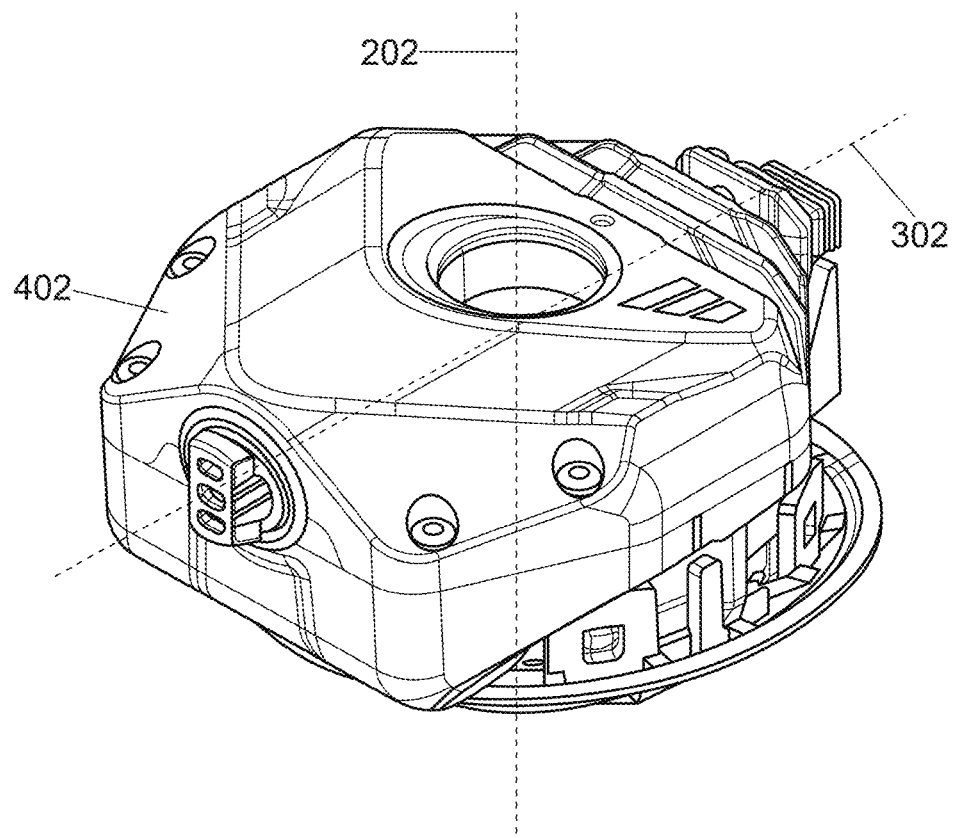
FIG. 4A illustrates a top, isometric, assembled view of an actuator to be used with a rear view device in accordance with aspects of the present disclosure.
Figure 4B:
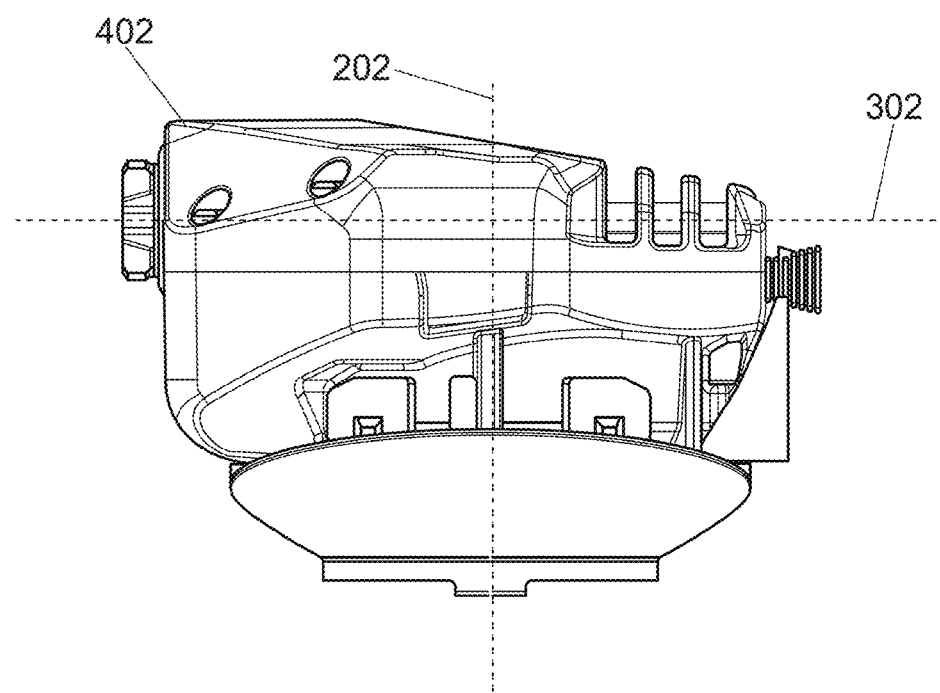
FIG. 4B illustrates a side view of the actuator of FIG. 4A.

FIG. 4 shows an actuator 402 in accordance with aspects of the present disclosure. As shown in the figure, the actuator 402 includes the axis 202 and the axis 302. The axis 202 is substantially perpendicular to the axis 302. Further, the axis 202 is substantially vertical relative to actuator 402 and the axis 302 is substantially horizontal relative to actuator 402.

Figure 5A:
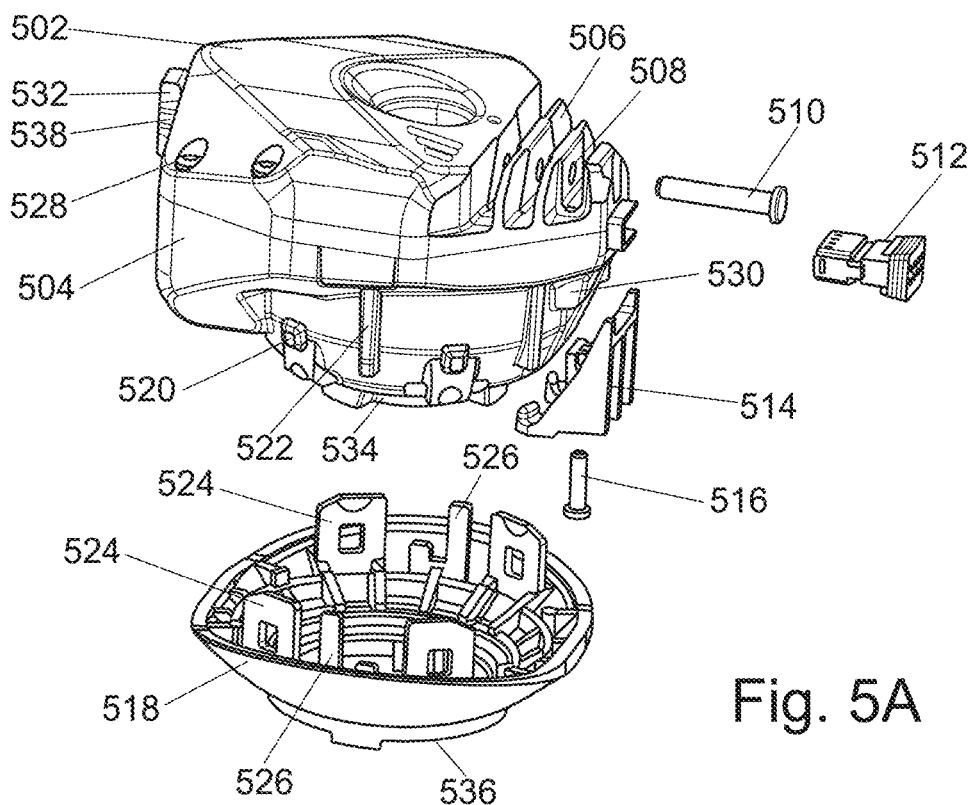
FIG. 5A illustrates an isometric exploded view of the actuator of FIG. 4A.
Figure 5B:
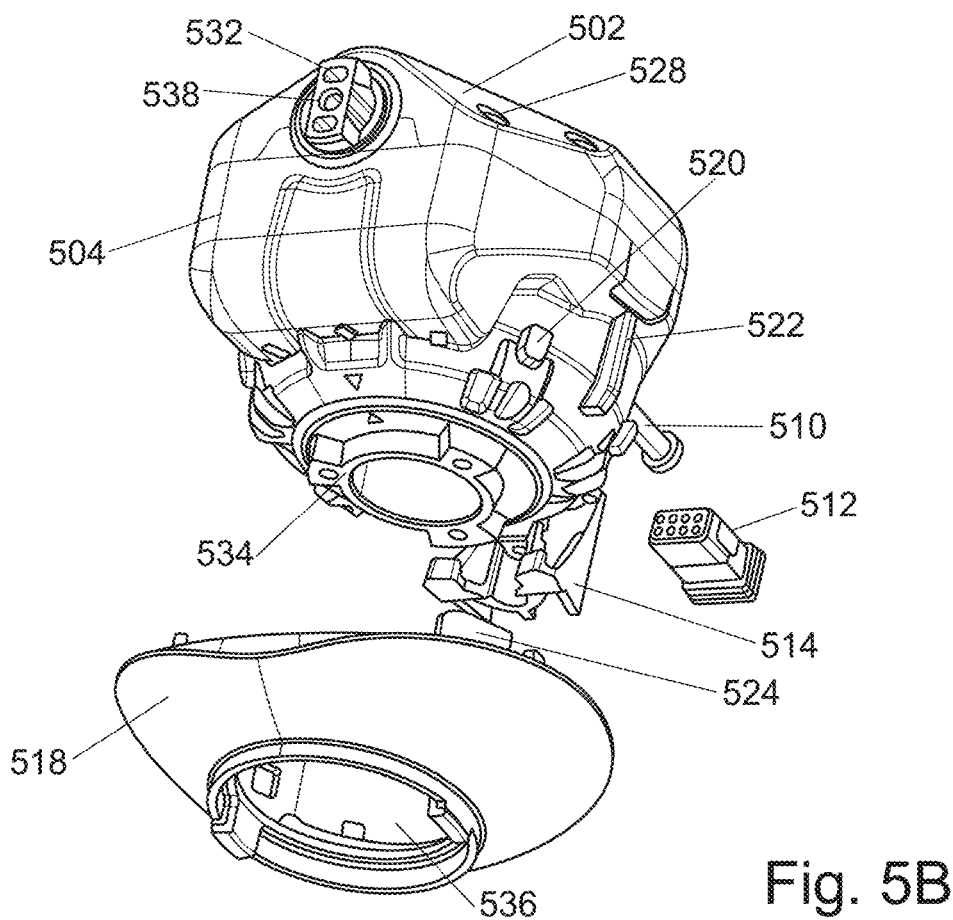
FIG. 5B illustrates an additional isometric exploded view of the actuator of FIG. 4A.

FIG. 5A shows an exploded view of the actuator 402 of FIG. 4 in accordance with aspects of the present disclosure. FIG. 5B shows an additional exploded view of the actuator 402 in accordance with aspects of the present disclosure.

As shown in the FIGS. 5A-B, the actuator 402 further includes an upper housing 502, a lower housing 504, an interleaved hinge 506 providing one or more connection spaces between two layers, projections or the like, an aperture 508, a tail-pin 510, a connector 512, a camera mount 514, a fastener 516, a shroud 518, protrusions 520, guides 522, a further fastener 528, a further aperture 530, a tilt axle 532, and a foot 534. The shroud 518 provides a spherical seat and further includes one or more clips 524, one or more guides 526, and a still further aperture 536. The tilt axle 532 further comprises an aperture 538.

The upper housing 502 and the lower housing 504 are operable to house the internal components of the actuator 402. The upper housing 502 and the lower housing 504 are additionally operable to be joined or fastened together by the fastener 528. In this example variation, the fastener 528 is illustrated as a bolt. However, in other variations, the fastener 528 may be a pin, weld, clip or any other fastener or fastening method that allows the upper housing 502 and the lower housing 504 to be joined together.

The interleaved hinge 506 is operable to allow movement of a case frame (see case frame 802 in FIGS. 8-14B) of the rear view device 102. The interleaved hinge 506 is additionally operable to contain the aperture 508 and to be comprised of multiple protrusions with gaps in-between each successive protrusion. The gaps between the protrusions allow the case frame 802 with corresponding protrusions to be interleaved with the interleaved hinge 506.

The aperture 508 is operable to allow insertion of the tail-pin 510 and to be axially aligned with an aperture of an interleaved hinge of the case frame 802 as will be explained below (shown in FIGS. 8-14B). The aperture 508 is further operable to be axially aligned with the axis 302 of FIG. 3.

The tail-pin 510 is operable to be placed through the aperture 508 of the interleaved hinge 506. The tail-pin 510 is additionally operable to be placed through the aperture 508 and an aperture of a case lower 602 or the case frame 802 (shown in FIGS. 6-14B) interleaved with interleaved hinge 506. The operation and interleaving of the case lower 602 or the case frame 802 with the interleaved hinge 506, the aperture 508, and the tail-pin 510 will be further discussed later with additional reference to FIGS. 6-14B.

The connector 512 is operable to be inserted into the actuator 402. When the connector 512 is inserted into the actuator 402, it may deliver power from the vehicle to the actuator 402.

The camera mount 514 is operable to connect to the lower housing 504 of the actuator 402 and to be fixed to the actuator 402 by placing the fastener 516 through the camera mount 514 and into the aperture 530.

In this example variation, the fastener 516 is illustrated as a bolt, however in other example variations, the fastener 516 may be a pin, weld, clip or any other fastener or fastening method that enables the fixing of the camera mount 514 to the actuator 402. Additionally, in this example variation, the camera mount 514 is designed to secure a camera (not shown) for use with the rear view device 102; however in other variations, the camera mount 514 could be used to secure any one of a number of components used in the rear view device 102. Non-limiting examples of components which could be mounted on the camera mount 514 include a multi-functional lamp unit, a turn signal module, an approach lamp, or an electronic module such as a GPS module or Wi-Fi module.

The shroud 518 is operable to attach to the actuator 402 in order to provide a seal for any gaps created between the mirror base 204 and the mirror head 206. The shroud 518 is further operable to be attached to the actuator 402 via the lower housing 504. The shroud 518 comprises the one or more guides 526 which are aligned with the guides 522 of the lower housing 504. When assembled, the geometry of the guides 522 and the guides 526 interact in order to align the shroud 518 for proper placement onto the lower housing 504. During assembly, as the shroud 518 is placed onto the lower housing 504, the clips 524 of the shroud 518 interlock with the protrusions 520 of the lower housing 504 in order to secure the shroud 518 to the actuator 402. In this example variation, the shroud 518 is secured to the lower housing 504 of the actuator 402 via the clips 524. In other example variations, the shroud 518 may be secured to the actuator 402 via any other fastening method, non-limiting examples of which include bolts, welds, crimps, or adhesives.

The shroud 518 is additionally operable to have the aperture 536. When the shroud 518 is assembled and connected to the actuator 402, the foot 534 is able to fit inside the aperture 536. Once the foot 534 is fit into the aperture 536 of the shroud 518, it may be connected to the mirror base 204 directly or a base frame 802 (shown in FIGS. 18-24B) of the mirror base 204 to fix the actuator 402 in place.

The tilt axle 532 is operable to provide rotational movement about the axis 302 when driven by the actuator 402. The tilt axle 532 is additionally operable to be fastened to the case lower 602 or case frame 802 of the rear view device 102. The tilt axle 532 is further operable to comprise the aperture 538 to which a fastener may be attached. The tilt axle 532 is yet further operable to have a geometry that corresponds to a mounting element of the case lower 602 or the case frame 802. In this variation, the geometry of the tilt axle 532 is rectangular however, any shape may be used to allow the tilt axle 532 to be fit into a corresponding mounting element. It should be noted that the tilt axle 532, the aperture 538, and the aperture 508 are axially aligned with the axis 302 described in FIG. 3.

The foot 534 is operable to provide a connection to the mirror base 204 of the rear view device 102. The foot 534 is additionally operable to connect to the mirror base 204 through the aperture 536 in the shroud 518.

Figure 6:
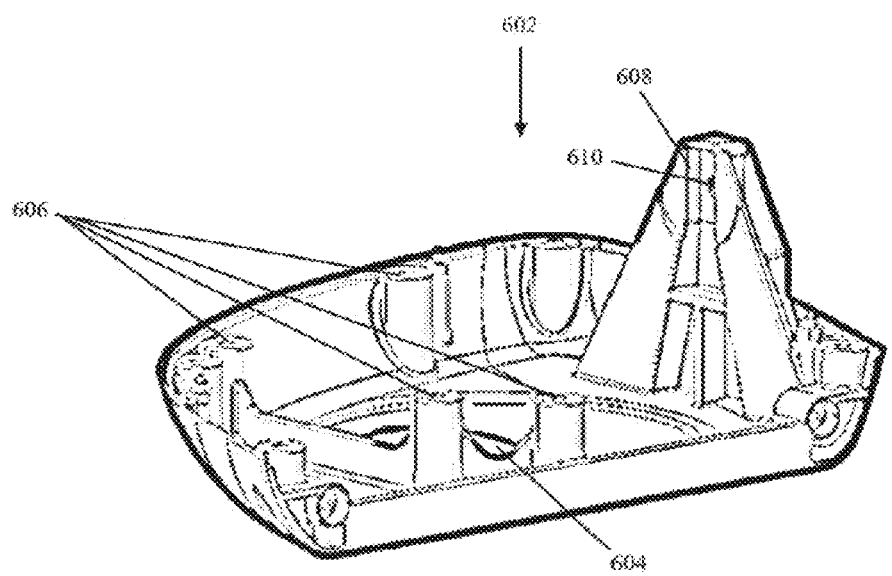
FIG. 6 illustrates a case lower to be used with a rear view device in accordance with aspects of the present disclosure.

FIG. 6 shows the case lower 602 in accordance with aspects of the present disclosure. As shown in the figure the case lower 602 further comprises an aperture 604, at least one first mount 606, a second mount 608, and a further aperture 610.

The case lower 602 is operable to provide a connection to the actuator 402 and a mounting point for the case frame 802. It is not illustrated in the FIG. 6, but the case lower 602 is additionally operable to provide, at least partially, a mounting point for a device, a backing plate, a bezel, a camera, a mirror cover, a light module, a multi-functional lamp, a turn signal, a light module, an antenna and/or any other component that may be included in the rear view device.

The aperture 604 is operable to provide a space for the foot 534 of the actuator 402 to be connected to the mirror base 204 of the rear view device 102. The aperture 604 is additionally operable to have a geometry that is complimentary to that of the shroud 518 of the actuator 402. The complimenting geometry allows the edge of the aperture 604 to rotate around the shroud 518 when the case lower 602 is moved while maintaining contact between aperture the 604 and the shroud 518. The continuous contact between the shroud 518 and the circumferential edge of the aperture 604 during movement of the case lower 602 seals the gap between the actuator 402 and the case lower 602, inhibiting the intrusion of contaminants into the mirror head 206.

Each first mount 606 is operable to provide a mounting point in order to mount the case frame 802 to the case lower 602.

The second mount 608 is operable to provide a mounting point in order to mount the tilt axle 532 of the actuator 402 to the case lower 602. The second mount 608 is additionally operable to have a geometry such that it is able to receive the tilt axle 532 of the actuator 402. The second mount 608 is further operable to contain the aperture 610 through which a fastener may be inserted to fasten the tilt axle 532 to the case lower 602. The aperture 610 is operable to receive a fastener as well as operable to be axially aligned with the axis 302 of FIG. 3. As can be seen in FIG. 6, the second mount 608 has the general shape of a rectangular slot. This slot corresponds to the rectangular shape of the tilt axle 532. During assembly, the tilt axle 532 can be rotated until it is aligned with the second mount 608 such that once aligned, the tilt axle 532 can be lifted up and fit into the mount 608 and then fixedly attached by inserting a fastener through the aperture 610 and into the aperture 538 of the tilt axle 532. After being aligned and fastened, the tilt axle 532 and the case lower 602 become rotationally locked, meaning that when the actuator 402 rotates the tilt axle 532, the case lower 602 will rotate as well.

Figure 7:
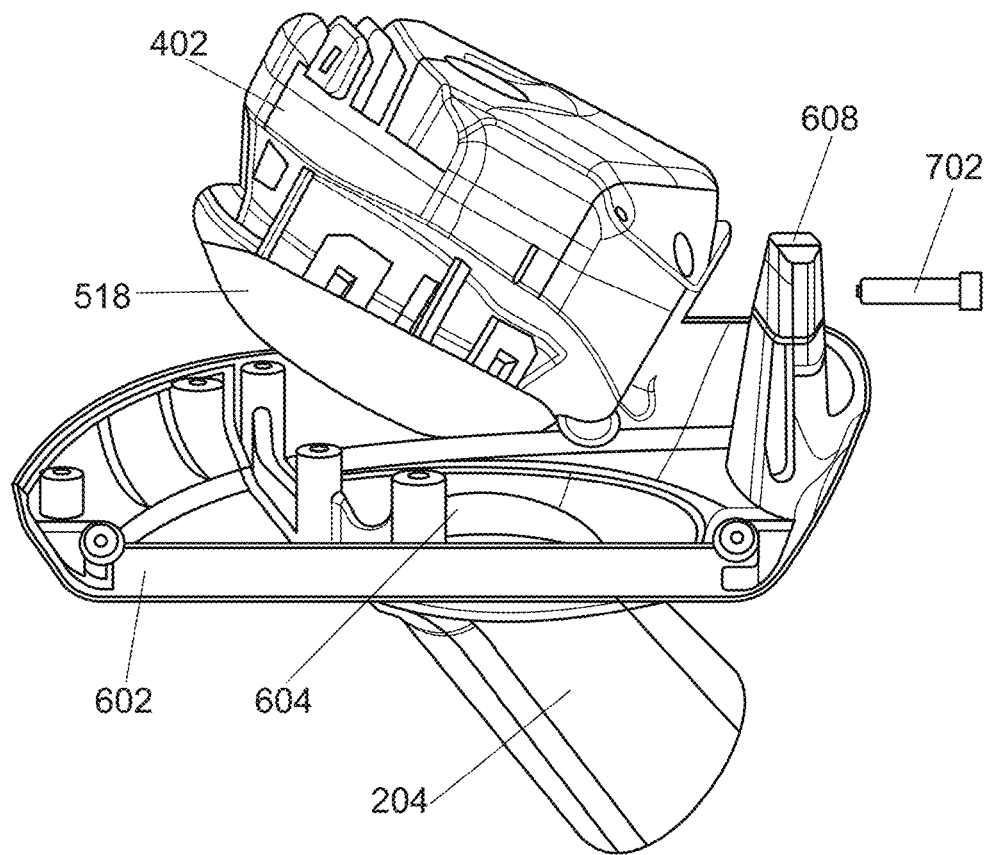
FIG. 7 illustrates the actuator of FIG. 4A being attached to the case lower of FIG. 6.

FIG. 7 illustrates the actuator 402 being assembled to the case lower 602 in accordance with aspects of the present disclosure, and the mirror base 204, and a fastener 702 are shown.

In operation, the actuator 402 is lowered onto the case lower 602 until the shroud 518 comes into contact with the aperture 604. Since the surface of the shroud 518 matches the surface of the aperture 604, once in contact, the actuator 402 will rest on the case lower 602, via the shroud 518. At this time, tilt axle 532 is fit into the mount 608. As described above, the geometry of the tilt axle 532 corresponds to that of the mount 608 such that the tilt axle 532 may be fit into the mount 608 and then secured by inserting the fastener 702 through the aperture 610 and into the tilt axle 532. In this manner, when the tilt axle 532 is rotated, the case lower 602 will rotate as well. In this embodiment, the fastener 702 is illustrated as a pin. However, in other variations, the fastener 702 may be a bolt, weld, snap, or any other fastener or fastening method that enables the tilt axle 532 to be attached to the mount 608.

At this point, the case lower 602 has been attached to the actuator 402 via the fastener 702. However, it should be obvious to those skilled in the art an issue that would arise with using one attachment point. Further, it is desired to provide a means and a method of attachment for the rest of the components used in the device. The issue of a single attachment point between the case lower 602 and actuator 402 as well as the issue of providing attachment means for other elements is solved by the use of the case frame 802, which acts as a motor cradle by attaching the actuator 402. Such a case frame 802 for use in a device 102, 104 in accordance with aspects of the present disclosure will now be discussed with additional reference to FIGS. 8-14B.

Figure 8:
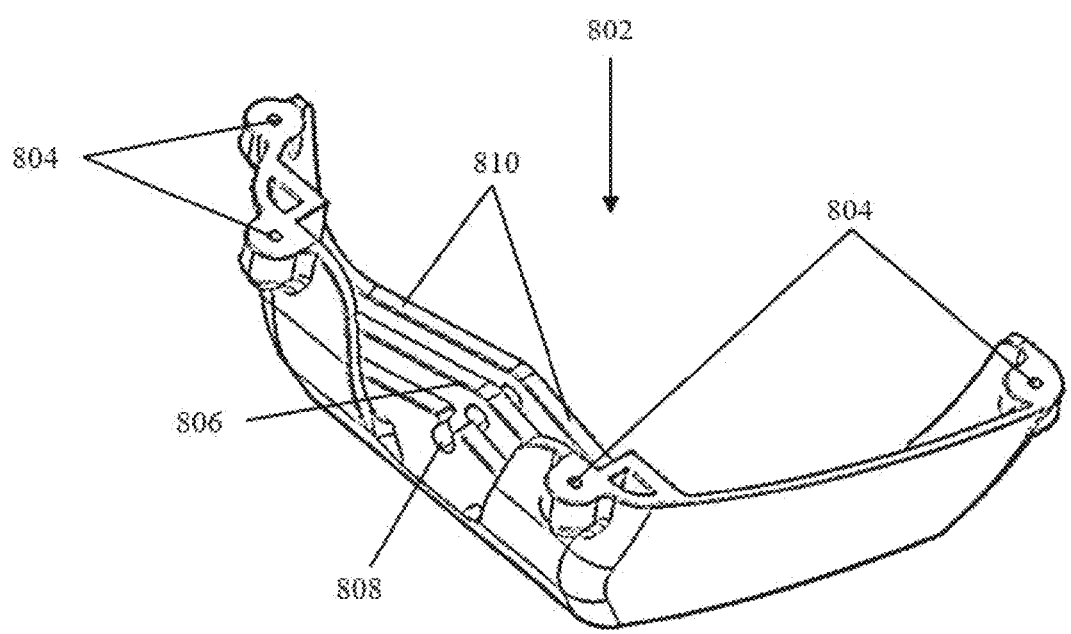
FIG. 8 illustrates a case frame to be used with a rear view device in accordance with aspects of the present disclosure.

FIG. 8 illustrates that the case frame 802 in accordance with aspects of the present disclosure includes a mount 804, an interleaved hinge 806, an aperture 808, and webs 810.

The case frame 802 is operable to provide a connection to the actuator 402 (not shown) via the interleaved hinge 806 and the aperture 808, as well as a mounting point for the case lower 602 via the mount 804. It is to be noted, although not illustrated in FIG. 8, the case frame 802 is additionally operable to provide, at least partially, a mounting point for a device, a backing plate, a bezel, a camera, a mirror cover, a light module, a multi-functional lamp, a turn signal, a light module, an antenna and/or any other component that may be included in a rear view device.

The mount 804 is operable to provide mounting points which correspond to the mount 606 of the case lower 602 in order to facilitate the attachment of the case frame 802 to the case lower 602. The mount 804 may be fastened to the mount 606 via one of a plurality of known fastening methods including bolts, clips, pins, welds, or any other known fastening method.

The interleaved hinge 806 of the case frame 802 is operable to have a geometry that is the mirror of the interleaved hinge 506 of the actuator 402 such that when assembled, the webs 810 of the interleaved hinge 806 fit in-between the webs of the interleaved hinge 506. The interleaved hinge 806 is additionally operable to be assembled with the interleaved hinge 506 such that the aperture 808 of the case frame 802 aligns with the aperture 508 of the actuator 402. The aperture 808 is operable to be axially aligned with the axis 302 of FIG. 3.

The webs 810 are operable to provide clearance between the case frame 802 and the actuator 402 during the operation of actuator 402.

Figure 9A:
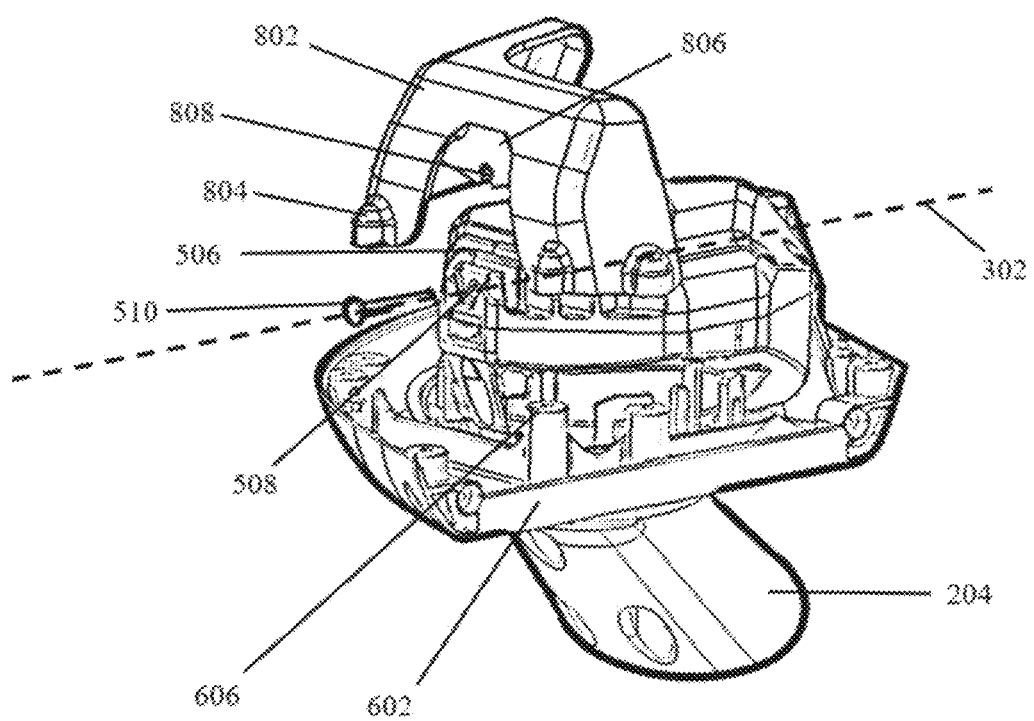
FIG. 9A illustrates the case frame of FIG. 8 being attached.

The assembly of the case frame 802 will now be discussed with additional reference to FIGS. 9A-B. FIG. 9A illustrates the case frame 802 being attached to a device in accordance with aspects of the present disclosure.

As shown, FIG. 9A includes the case frame 802 with its mount 804 and aperture 808; the case lower 602 with its mount 606; the tail-pin 510 and the aperture 508 of the upper housing 502 of the actuator 402; and the axis 302. The elements common between previous figures and FIGS. 9A-B have already been described, and for the purposes of brevity will not be described here again.

In operation, once the tilt axle 532 has been fastened to the case lower 602, the case frame 802 maybe attached. During this process, the case frame 802 is lowered on to the case lower 602 such that the mount 606 and the mount 804 are aligned, which allows the protrusions of the interleaved hinge 806 and the protrusions of the interleaved hinge 506 to be interleaved.

Figure 9B:
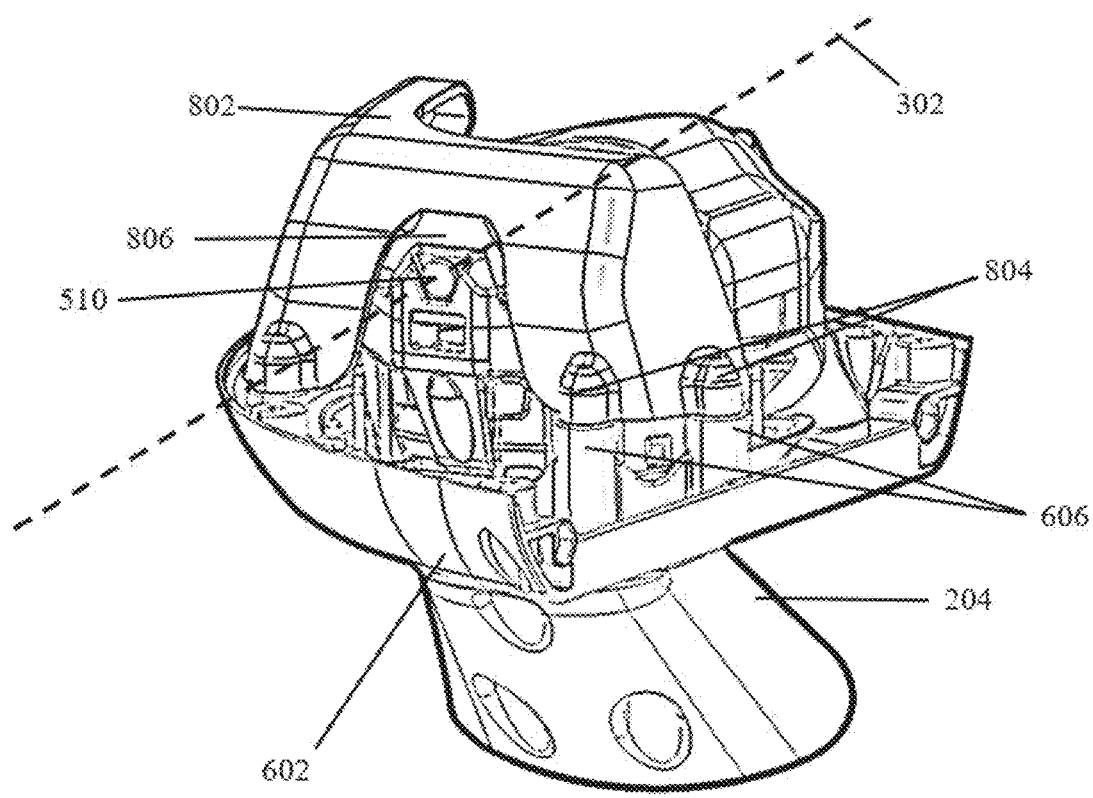
FIG. 9B illustrates an isometric view of the case frame of FIG. 8 being attached.

Referring to FIG. 9B, once the mount 606 and the mount 804 have been aligned, they may be fastened together to fix the case frame 802 to the case lower 602 via one of a plurality of known fastening methods including bolts, clips, pins, welds, or any other known fastening method.

With the case frame 802 securely attached to the case lower 602, the aperture 508 and the aperture 808 are axially aligned which allows the insertion of the tail-pin 510. Once inserted, the tail-pin 510 secures the case frame 802 and the case lower 602 to the actuator 402. The securing of the case frame 802 and the case lower 602 to the actuator 402 provides the second attachment point for the case lower 602. The case lower 602 is now supported on two opposing ends of a single axis, which provides a large degree of rigidity and strength. Further, without being provided a second attachment point, the outer end of the case lower 602 would be free to move or vibrate which would increase in severity as the additional components are installed in the device.

At this point, the foot 534 of the actuator 402 can be attached to the mirror base 204. In this embodiment, fasteners are insert upwards through the mirror base 204 and into the foot 534 in order to securely fix the actuator 402. In other example variations, interlocking geometry, a locking ring, or any other method of attachment may be used in order securely attach the actuator to the mirror base. As described above, in this configuration the surface geometry of the shroud 518 and the aperture 604 of the case lower 602 creates a seal which substantially prevents the intrusion of contaminants into the mirror head 206.

In this manner, rotational motion around the axis 302 is transferred from the tilt axle 532 to the case lower 602 via the mount 608 (FIG. 7). Simultaneously, the transfer of rotational motion from the tilt axle 532 about the axis 302 results in the rotation of the case lower 602 about the axis 302 on the side of the actuator 402 opposite the tilt axle 532. There are two attachment points which are used to connect the case lower 602 to the actuator 402. The first attachment point is between the tilt axle 532 and the mount 608 of the case lower 602, which enables rotation of the case lower 602 around the fastener 702. The second attachment point is between the case frame 802 and the interleaved hinge 506, via the intermediate connection made by fixing the case lower 602 to the case frame 802, which enables rotation of the case frame 802 about the tail-pin 510. The two attachment points and their rotational focal points, namely the tail-pin 510 and the fastener 702, are axially aligned to the axis 302 in order to enable smooth rotational movement. If the rotational focal points were not aligned with the tilt axle 532 along the axis 302, there would be a torque induced by the misalignment which would impede movement.

It should be noted that with the case lower 602 effectively being attached to the actuator 402, the case lower 602 cannot fall and come into contact with the mirror base 204. Any interaction or contact between the case lower 602 and the mirror base 204 would inhibit the function of the actuator 402 which could lead to costly redesigns or replacements.

Additionally, attaching the case lower 602 to the actuator 402 in the manner described above leads to the inner circumference of the aperture 604 being held against the outer surface of the shroud 518. In this configuration, when the case lower 602 is moved via the rotation of the tilt axle 532, the edge of the aperture 604 rotates about the shroud 518 without clashing. This enables the smooth operation of the actuator 402 while maintaining a seal between the shroud 518 and the aperture 604 to prevent the intrusion of contaminants. The tilt operation of actuator 402 will now be discussed with additional reference to FIGS. 10A-10D.

Figure 10A:
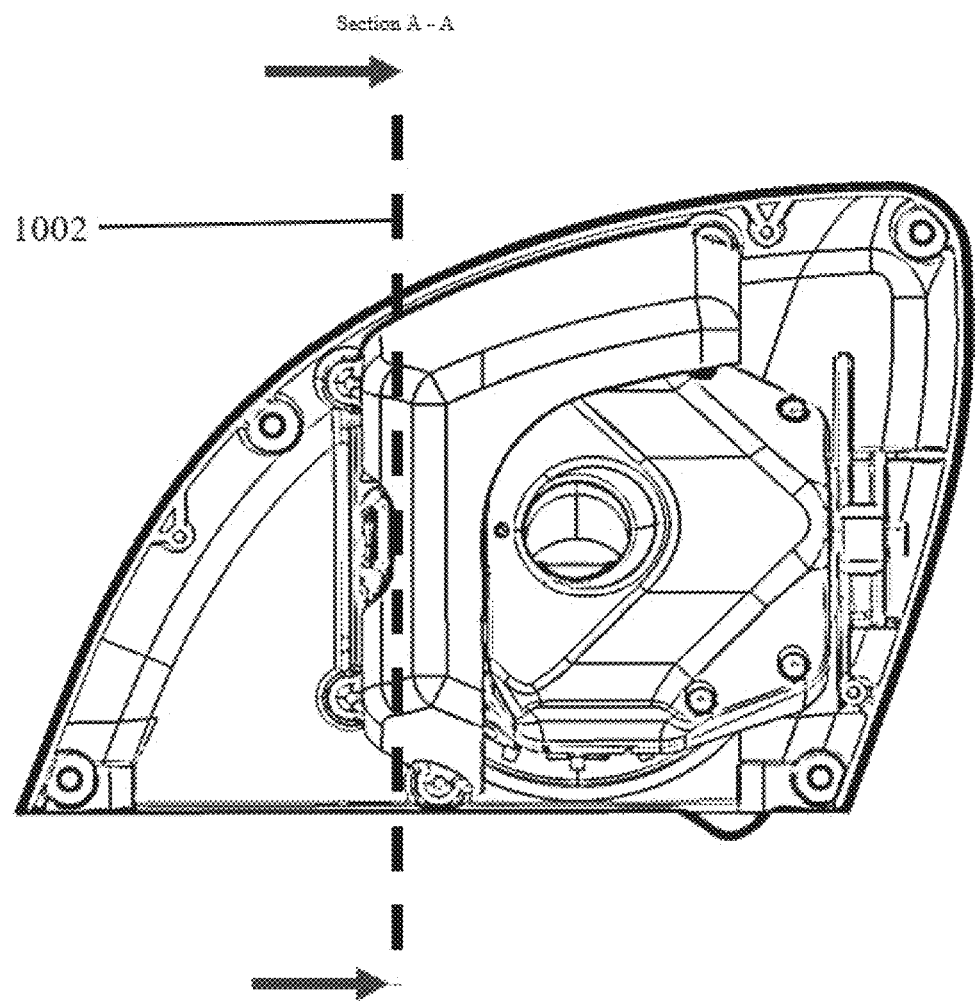
FIG. 10A illustrates a cross-section cut through the rear view device of FIG. 9B.
Figure 10B:
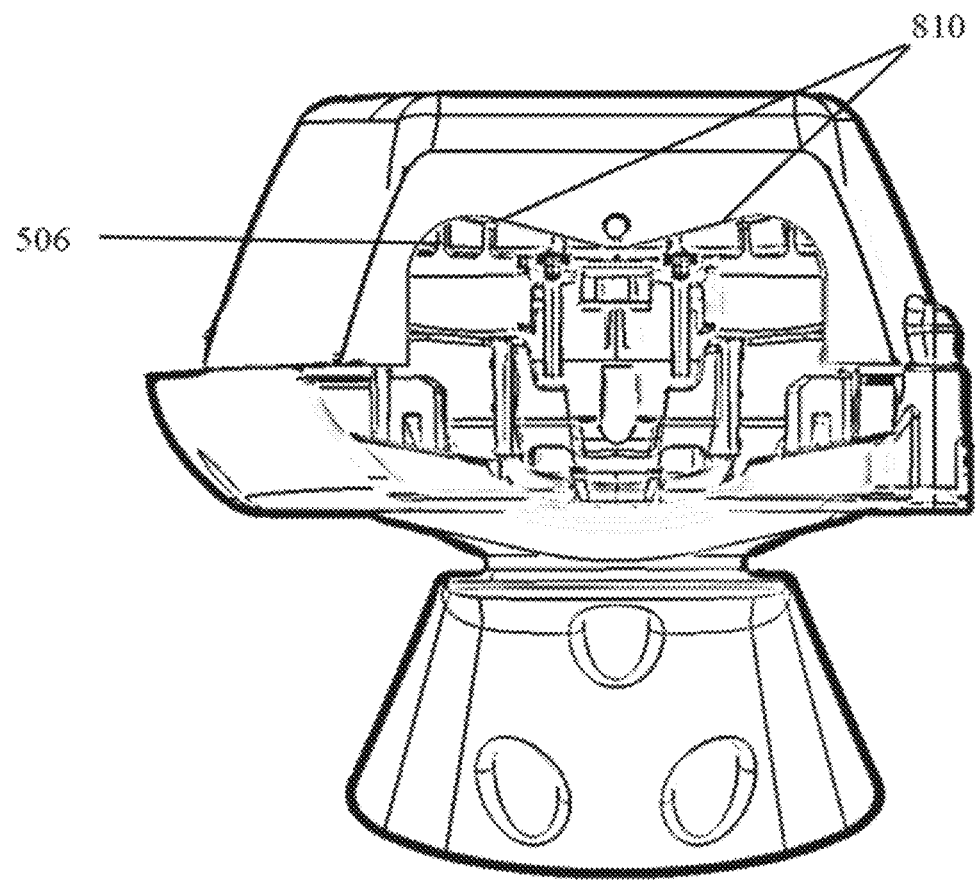
FIG. 10B illustrates the mirror head on view of the cross-section cut in line with FIG. 10A, with the mirror head in a nominal position.
Figure 10C:
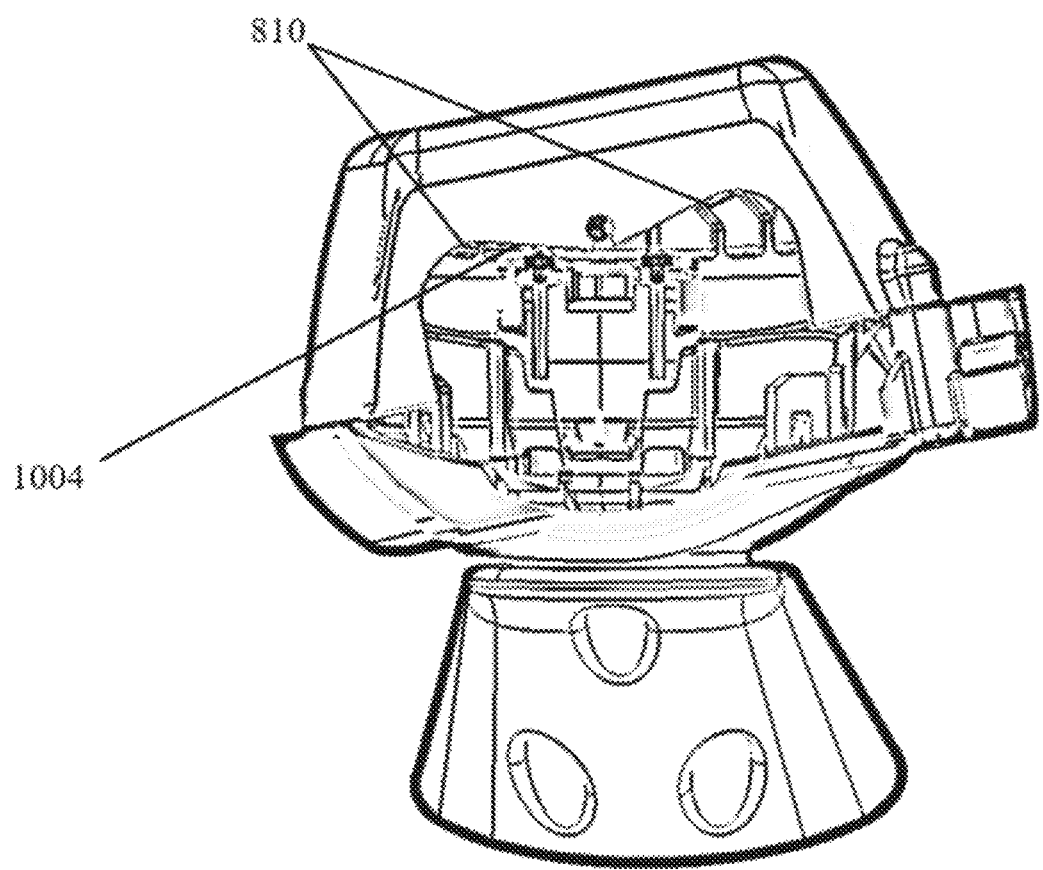
FIG. 10C illustrates the mirror head on view of the cross-section cut in line with FIG. 10A, with the mirror head tilted upwards.
Figure 10D:
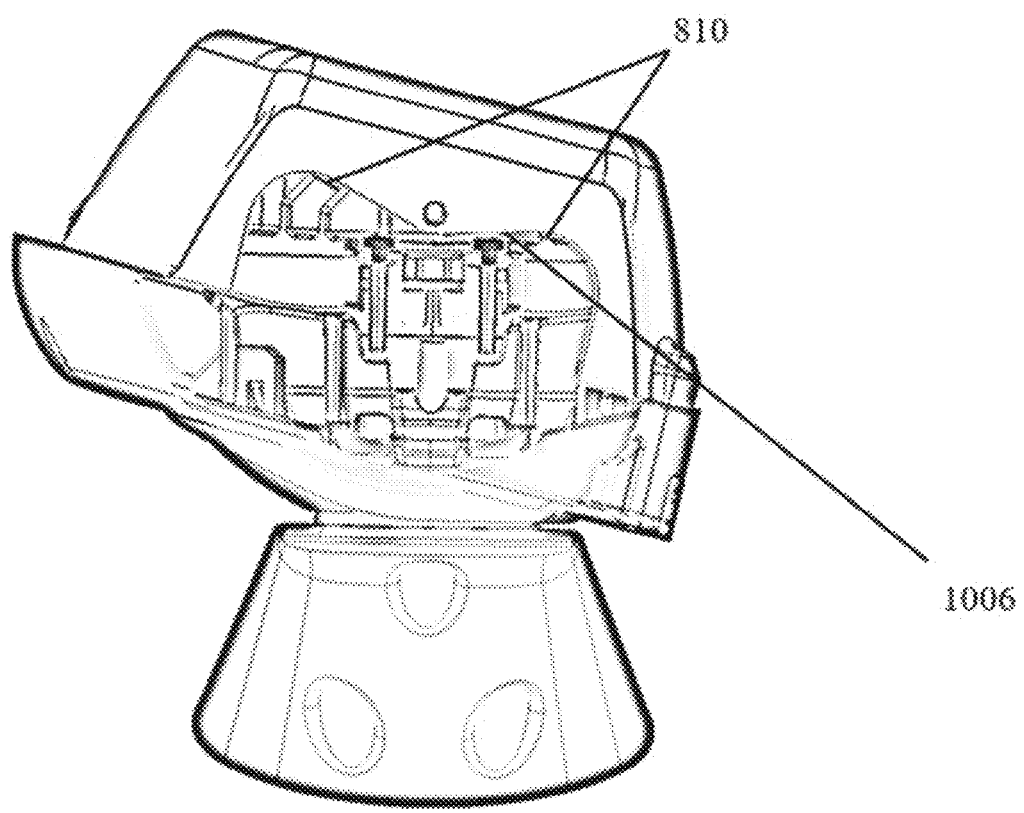
FIG. 10D illustrates the mirror head on view of the cross-section cut in line with FIG. 10A, with the mirror head tilted downwards.

FIG. 10A illustrates a cross section 1002 cut along the rear view device 102, 104, and FIGS. 10B-D illustrate head-on views along the cross section 1002 of the rear view device 102, 104 with the mirror head 206 in multiple nominal or tilted positions in accordance with aspects of the present disclosure. The elements common between previous figures and FIGS. 10A-D have already been described, and for the purposes of brevity will not be described here again. It should be noted that in FIGS. 10A-D, the tail-pin 510, the connector 512, and the camera mount 514 have been removed to provide a clear view of the interaction between the interleaved hinge 506 of the actuator 402 and the webs 810 of interleaved hinge 806 of the case frame 802.

As shown in FIG. 10B, when the mirror head 206 is in a nominal position, there is a gap between the webs 810 of the interleaved hinge 806 and the interleaved hinge 506 of actuator 402. FIG. 10C shows the view of mirror head 206 when tilted upward. When powered, the tilt axle 532 of the actuator 402 begins to rotate which in turn rotates the case lower 602 since it is rotationally locked to the tilt axle 532. Opposite of the tilt axle 532 is the tail-pin 510, which provides a point around which the case frame 802 may rotate. As illustrated in FIG. 10C, as the mirror head tilts upward the gap between the left side of the webs 810 of the interleaved hinge 806 and the base of the interleaved hinge 506 begins to decrease. Once the mirror head 206 is fully tilted upward, the sloped portion of the webs 810 touches the actuator 402 at the base of the interleaved hinge 506 shown by point 1004. The geometry of the webs 810 allows the sloped portion of the webs 810 and the base of the interleaved hinge 506 to be flush when they contact. The contact between the webs 810 and the base of the interleaved hinge 506 provides a hard stop for the actuator 402 and prevents the mirror head 206 from being tilted upward any further.

FIG. 10D, shows a view of the mirror head 206 when tilted downward. When powered, the tilt axle 532 of the actuator 402 begins to rotate in a direction opposite that shown in FIG. 10C which in turn rotates the case lower 602 since it is rotationally locked to the tilt axle 532. Opposite of the tilt axle 532 is the tail-pin 510, which provides a point around which the case frame 802 may rotate. As illustrated in FIG. 10D, as the mirror head 206 tilts downwards the gap between the right side of the webs 810 of the interleaved hinge 806 and the base of the interleaved hinge 506 begins to decrease. Once fully tilted downward, the sloped portion of the webs 810 contacts the actuator 402 at the base of the interleaved hinge 506 shown by point 1006. The geometry of the webs 810 allows the sloped portion of the webs 810 and the base of the interleaved hinge 506 to be flush when they contact. The contact between the webs 810 and the base of the interleaved hinge 506 provides a hard stop for the actuator 402 and prevents the mirror head 206 from being tilted downward any further.

In this manner, the tilting of the mirror head 206 can be achieved using the actuator 402 while preventing any unwanted contact between the case frame 802 and actuator housing 502, 504. Further, the sloped sides of the webs 810 of the case frame 802 allow contact between the case frame 802 and the actuator 402 to function as a hard stop mechanism to prevent over-travel of the mirror head 206 in the upward or downward direction during the tilt operation. Further, the tilting operation can be performed with a single actuator that also provides a powerfold operation.

In the previous example variations, a two part system comprising a case lower and case frame were used along with a single actuator to provide both the tilting and folding operations of a rear view device. However, in other variations a spider frame may be used, which will now be described with reference to FIGS. 11-12B.

Figure 11:
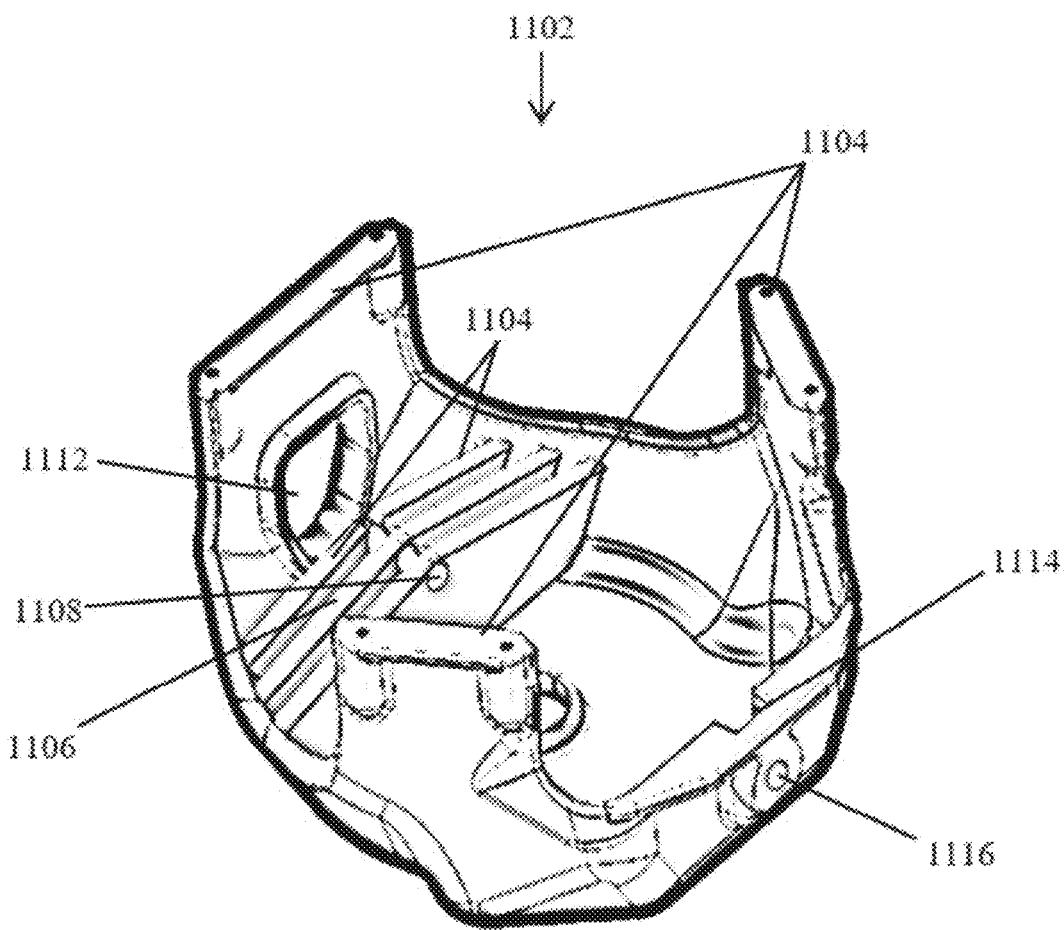
FIG. 11 illustrates an isometric view of a spider frame to be used with a rear view device in accordance with aspects of the present disclosure.

FIG. 11 illustrates a spider frame 1102 in accordance with aspects of the present disclosure, being an alternative to the cradle kind case frame 802. As shown in FIG. 11, the spider frame 1102 includes a mount 1104, an interleaved hinge 1106, an aperture 1108, a set of webs 1110, an aperture 1112, a mount 1114, and an aperture 1116.

The elements common between the case frame 802 and the spider frame 1102 are functionally similar. The mount 1104 is operable to provide an attachment mechanism to the case lower, 602; the interleaved hinge 1106 is operable to engage with the opposing interleaved hinge 506 of the actuator 402; the aperture 1108 is operable to be axially aligned with the axis 302 as well as to receive the tail-pin 510; and the webs 1110 are operable to provide clearance between the spider frame 1102 and the base of the interleaved hinge 506 of the actuator 402. The aperture 1112 is operable to provide an opening such that the tail-pin 510 may be insert into the aperture 1108.

The spider frame 1102 additionally includes several elements that were attached to the case lower 602 in previous variations, namely the mount 1114 and the aperture 1116. The mount 1114 and the aperture 1116 are functionally similar to the corresponding elements of the case lower 602. As you can see in FIG. 11, the mount 1114 has the general shape of a rectangular slot. The rectangular slot shape corresponds to the rectangular shape of the tilt axle 532. During assembly, the tilt axle 532 can be rotated until it is aligned with the mount 1114 such that once aligned, the tilt axle 532 can be lifted up and fit into the mount 1114 and then fixedly attached by inserting the fastener 702 through the aperture 1116 and into the aperture 538 of the tilt axle 532. After being aligned and fastened, the tilt axle 532 and the spider frame 1102 become rotationally locked, meaning that when the actuator 402 rotates the tilt axle 532, the spider frame 1102 will rotate as well.

The assembly of the spider frame 1102 will now be discussed with additional reference to FIGS. 12A-B.

Figure 12A:
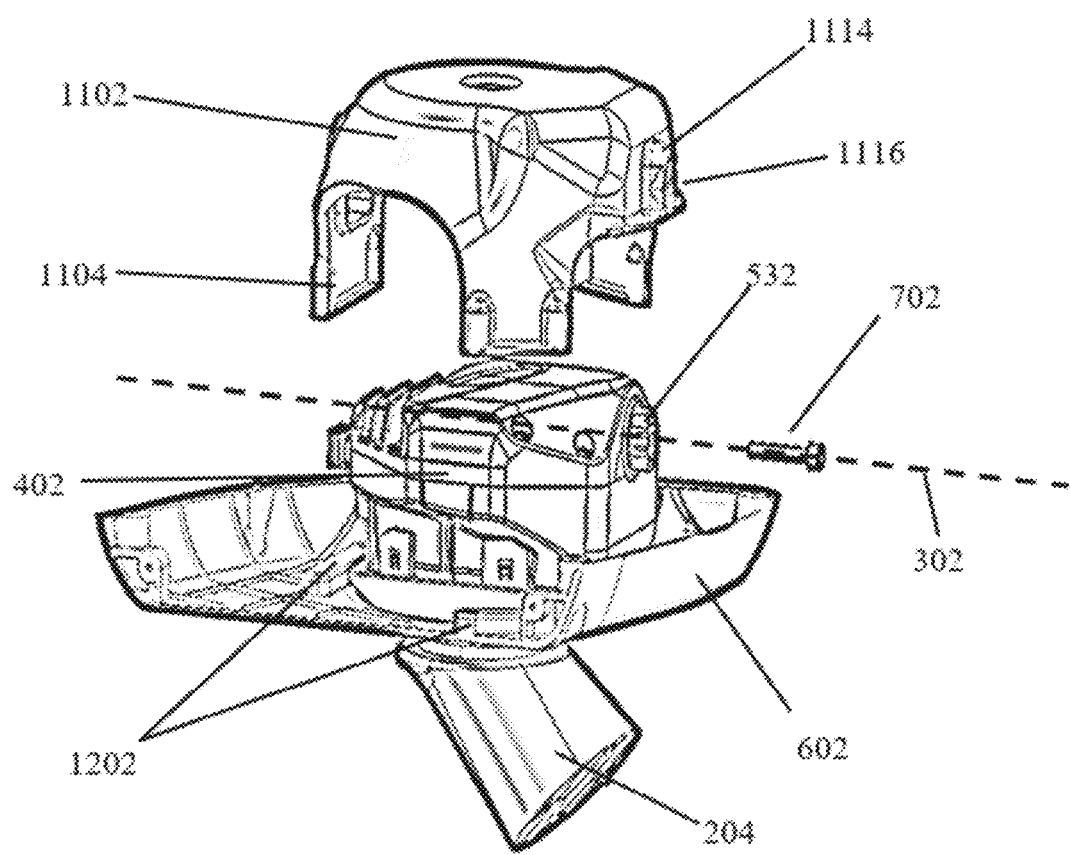
FIG. 12A illustrates an exploded isometric side view of the spider frame of FIG. 11 being attached to a partial rear view device.

FIG. 12A illustrates the spider frame 1102 being attached to the rearview mirror assembly in accordance with aspects of the present disclosure. A mount 1202 of the case lower 602 is operable to provide a mounting point which corresponds to the mount 1104 of the spider frame 1102. The difference between the mount 1202 and mount the 606 described in FIG. 6 is that the geometry of the mount 1202 has been modified such that it may be attached to the mount 1104 of the spider frame 1102.

Figure 12B:
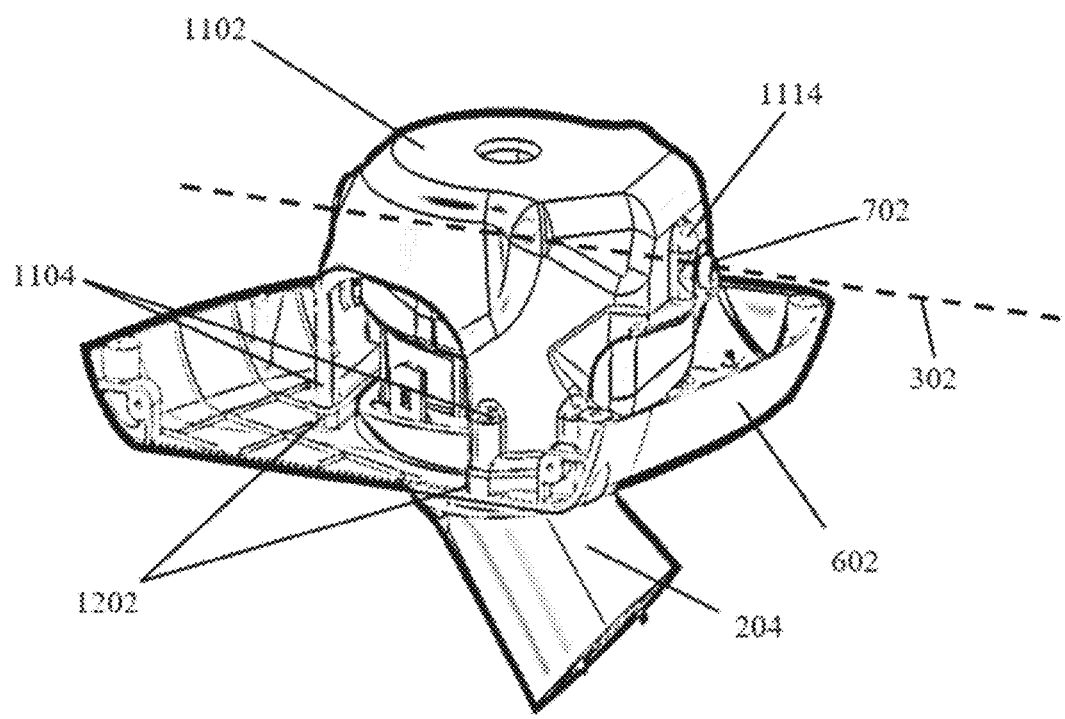
FIG. 12B illustrates an assembled isometric view of the spider frame attached to the partial rear view device of FIG. 12B.

FIG. 12B illustrates the spider frame 1102 that has been attached to the rear view device in accordance with aspects of the present disclosure. Once the spider frame 1102 is attached to the actuator 402 and the case lower 602, the system may operate as described previously in FIGS. 10A-

D. In short, on a first side, the tilt axle 532 is insert into the mount 1114 of the spider frame 1102 and then held in place via the insertion of the fastener 702. On the side of the actuator 402 opposite the tilt axle 532, the tail-pin 510 can be insert into the aperture 508 of the interleaved hinge 506 and the aperture 1108 of the interleaved hinge 1106. At this time, the mount 1104 of the spider frame 1102 may be fixed to the mount 1202 of the case lower 602.

Once the spider frame 1102 has been installed, the actuator 402 can be operated in order to provide movement to the mirror head 206. When the actuator 402 is powered it can begin to rotate the tilt axle 532. Since the fastener 702 and the tail-pin 510 used to attach the spider frame 1102 to the actuator 402 are axially aligned along the axis 302, the rotational motion of the tilt axle 532 can be transferred to the mirror head 206 such that it rotates about the axis 302, via the spider frame 1102 and case lower 602. The geometry of the interleaved hinges 506, 1106 of the actuator 402 and spider frame 1102 enable movement of the spider frame 1102 and case lower 602 without interference. When tilted either upward or downward to the maximum designed angle, the surface of one the sloped sides of the webs 1110 of the spider frame hinge 1106 contact the base portion of the actuator interleaved hinge 506 in order to prevent further tilting of the mirror head 206.

In the previous embodiments, a two part system comprising a case lower and a case frame or spider frame were used along with a single actuator to provide both the tilting and folding operations of a rear view device. However, in other variations a bezel mounted case frame 1302 may be used, which will now be described with reference to FIGS. 13-14B.

Figure 13:
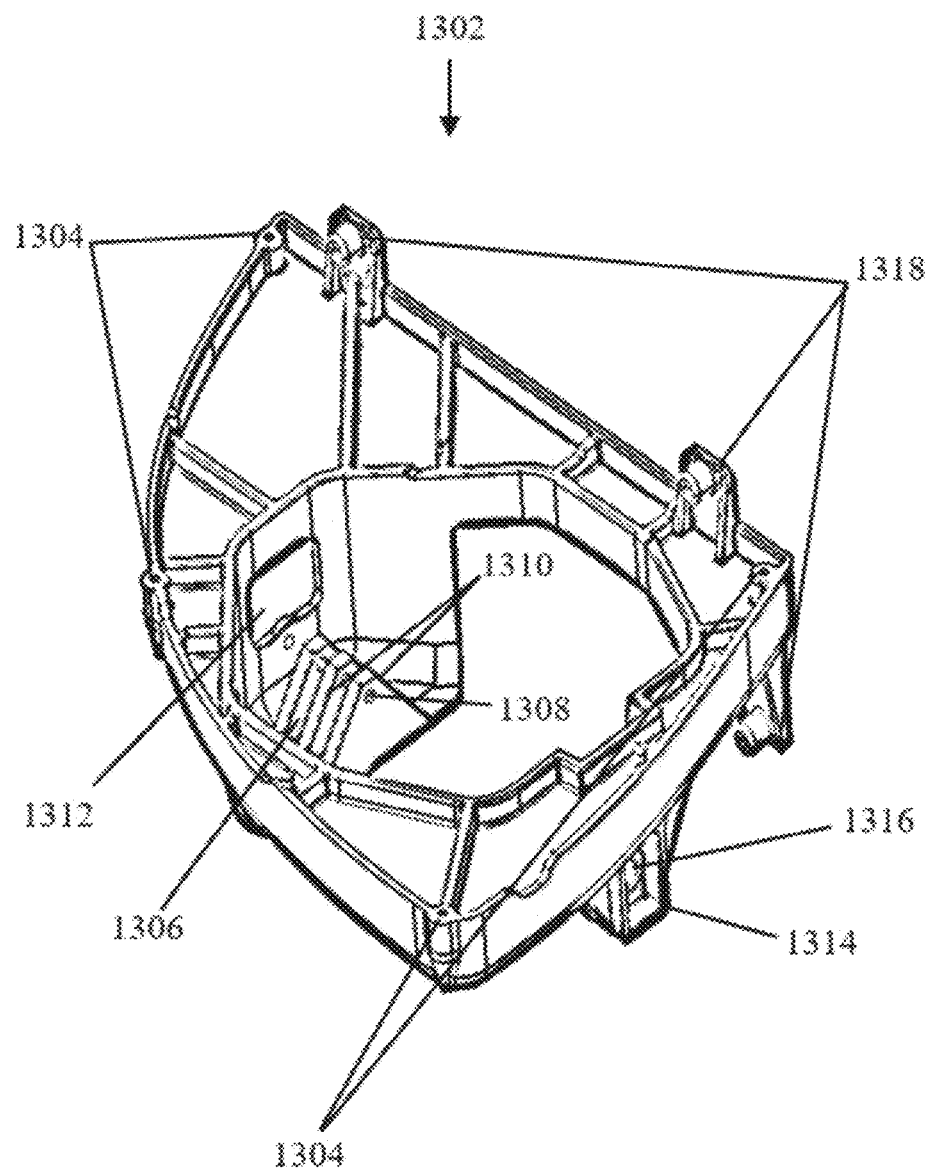
FIG. 13 illustrates a top isometric view of a bezel mounted case frame in accordance with aspects of the present disclosure.

FIG. 13 illustrates the bezel mounted case frame 1302 in accordance with aspects of the present disclosure, and the bezel mounted case frame 1302 includes a mount 1304, an interleaved hinge 1306, an aperture 1308, a set of webs 1310, an aperture 1312, a mount 1314, an aperture 1316, and a mount 1318.

The elements common between the case frame 802 and the bezel mounted case frame 1302 are functionally similar. The mount 1304 is operable to provide an attachment mechanism to the case lower 602, the interleaved hinge 1306 is operable to engage with the opposing interleaved hinge 506 of the actuator 402, the aperture 1308 is operable to be axially aligned with the axis 302 as well as to receive the tail-pin 510; and the webs 1310 are operable to provide clearance between the bezel mounted case frame 1302 and the base of the interleaved hinge 506 of the actuator 402. The aperture 1312 is operable to provide an opening such that the tail-pin 510 may be insert into the aperture 1308.

The bezel mounted case frame 1302 additionally includes several elements that were attached to the case lower 602 in previous variations, namely the mount 1314 and the aperture 1316. The mount 1314 and the aperture 1316 are functionally similar to the corresponding elements of the case lower 602. As you can see in FIG. 13, the mount 1314 has the general shape of a rectangular slot. The rectangular slot shape corresponds to the rectangular shape of the tilt axle 532. During assembly, the tilt axle 532 can be rotated until it is aligned with the mount 1314 such that once aligned, the tilt axle 532 can be lifted up and fit into the mount 1314 and then fixedly attached by inserting the fastener 702 through the aperture 1316 and into the aperture 538 of the tilt axle 532. After being aligned and fastened, the tilt axle 532 and the bezel mounted case frame 1302 become rotationally locked, meaning that when the actuator 402 rotates the tilt axle 532, the bezel mounted case frame 1302 will rotate as well.

The assembly bezel mounted case frame 1302 will now be discussed with additional reference to FIGS. 14A-B.

Figure 14A:
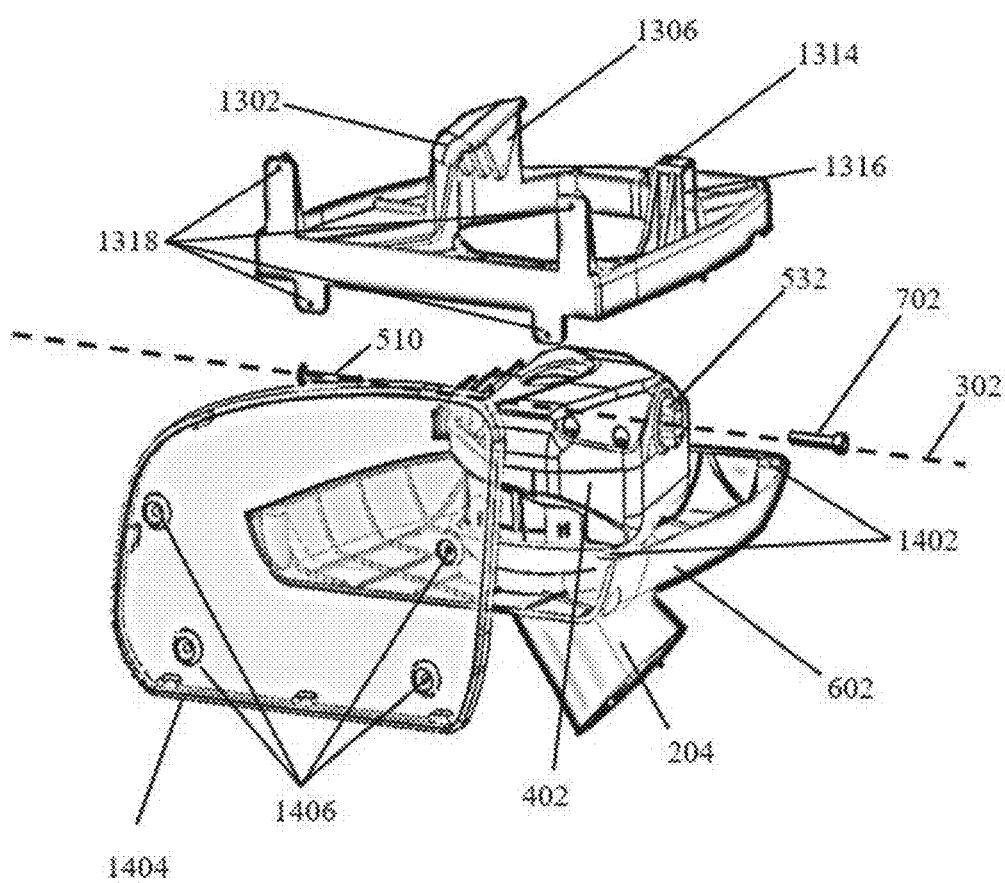
FIG. 14A illustrates an exploded isometric view of the bezel mounted case frame being attached to a partial device in accordance with aspects of the present disclosure.

FIG. 14A illustrates the bezel mounted case frame 1302 being attached to the rear view device in accordance with aspects of the present disclosure. A mount 1402, a bezel like backing plate assembly 1404 and a mount 1406 are shown in addition to the mount 1304, the interleaved hinge 1306, the mount 1314, the aperture 1316, the mount 1318, the fastener 702, the case lower 602, the tilt axle 532, the actuator 402, and the axis 302. The elements common between previous figures and FIGS. 14A-B have already been described, and for the purposes of brevity will not be described here again.

The mount 1402 of the case lower 602 is operable to provide a mounting point which corresponds to the mount 1304 of the bezel mounted case frame 1302. The difference between the mount 1402 and the mount 606 described in FIG. 6 is that the mount 1402 has been modified such that it may be attached to the mount 1304 of the bezel mounted case frame 1302.

The backing plate assembly 1404 is operable to provide or support a means of reflecting the view from the rearward of the vehicle 100 towards the driver of the vehicle 100. In this example variation, the backing plate assembly 1404 is provided as a complete assembly, in other variations, the backing plate assembly 1404 may be provided as a frame or mounting portion to which a glass or reflective element may be attached at a later time. The backing plate assembly 1404 is additionally operable to comprise the mount 1406 which allow attachment to the mount 1318 of the bezel mounted case frame 1302.

Figure 14B:
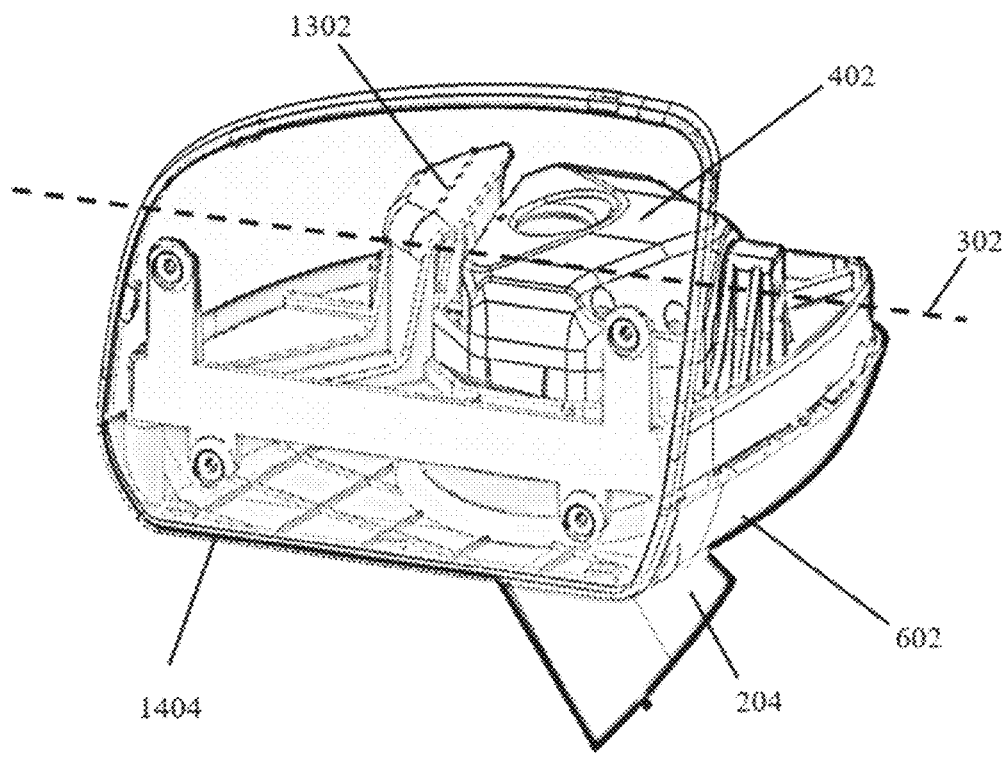
FIG. 14B illustrates an assembled isometric side view of the bezel mounted case frame attached to a partial device in accordance with aspects of the present disclosure.

FIG. 14B illustrates the bezel mounted case frame 1302 that has been attached to the rear view device in accordance with aspects of the present disclosure. As shown in FIG. 14B, once the bezel mounted case frame 1302 is attached to the actuator 402 and the case lower 602, the system may operate as described previously in FIGS. 10A-D. In short, the tilt axle 532 is insert into the mount 1314 of the bezel mounted case frame 1302 and then held in place via the insertion of the fastener 702. On the side of the actuator 402 opposite the tilt axle 532, the tail-pin 510 can be insert into the aperture 508 of the interleaved hinge 506 and the aperture 1308 of the interleaved hinge 1306. At this time, the mount 1304 of the bezel mounted case frame 1302 may be fixed to the mount 1402 of the case lower 602. The backing plate assembly 1404 may then be attached to the bezel mounted case frame 1302 by fixing the mount 1406 to the mount 1318.

Once the bezel mounted case frame 1302 has been installed the actuator can be operated. When the actuator 402 is powered it can begin to rotate the tilt axle. Since the fastener 702 and tail-pin 510 used to attach the bezel mounted case frame 1302 to the actuator 402 are axially aligned along the axis 302, the rotational motion of the tilt axle 532 can be transferred to the entire mirror head 206 such that it rotates around the axis 302, via the bezel mounted case frame 1302 and case lower 602. The geometry of the interleaved hinges 506, 1306 of both the actuator 402 and the bezel mounted case frame 1302 enable movement of the bezel mounted case frame 1302 and case lower 602 without interference. When tilted either upward or downward to the maximum designed angle, the surface of one side of the sloped sides of the webs 1310 of the bezel mounted case frame 1302 contact the base portion of the actuator interleaved hinge 506 in order to prevent further tilting of the mirror head.

In further embodiments, a rear view device with an actuator for mirror adjustment may be provided with a gasket to seal any gap between the shroud 518 and case lower 602, which will now be described with reference to FIGS. 15-24B.

Figure 15:
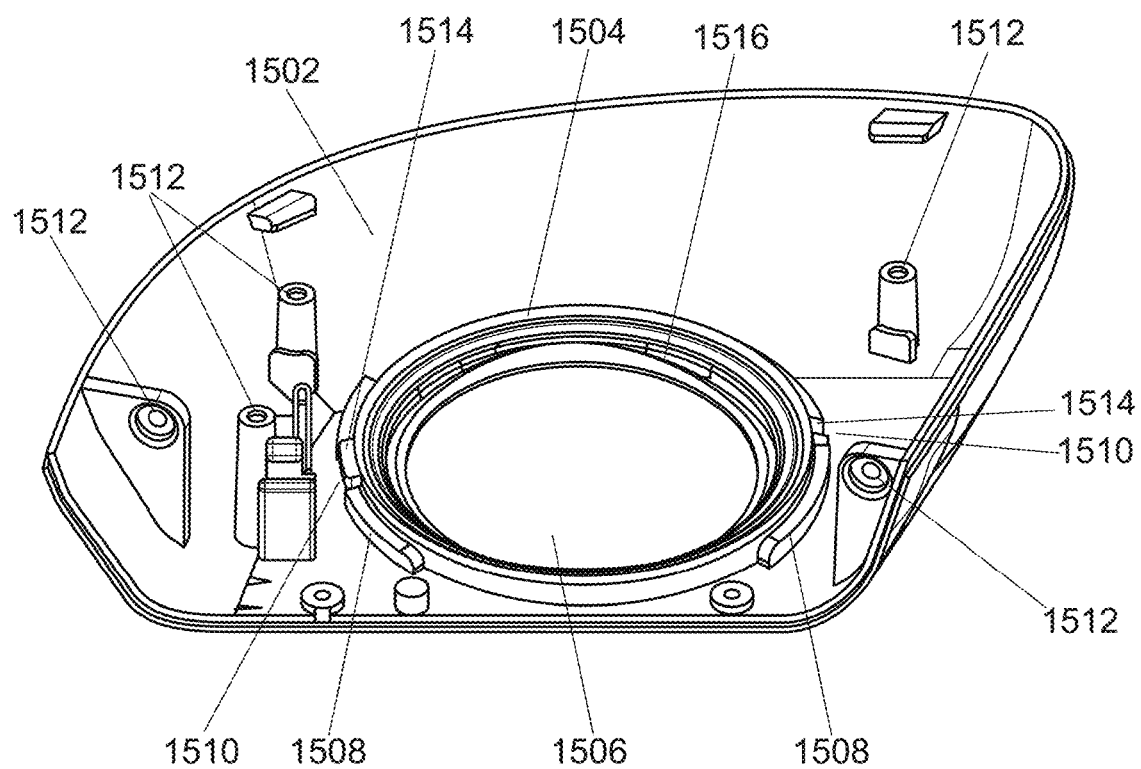
FIG. 15 illustrates a case lower and gasket of a rear view device in accordance with aspects of the present disclosure.

FIG. 15 illustrates a case lower 1502 and a gasket 1504 in accordance with aspects of the present disclosure. As shown, the case lower 1502 includes an aperture 1506, a guide 1508, at least one recess 1510, and attachment points 1512. The gasket 1504 includes an at least one protrusion 1514 and a seal 1516. The aperture 1506 is operable to provide an opening through which a mirror base (not shown) can be connected to an actuator (not shown). Each attachment point 1512 is operable to provide a point to which a case frame (not shown) may be attached to the case lower 1502. The guide 1508 is provided on the case lower 1502 with a curvature that matches the curvature of the gasket 1504. When at least one protrusion 1514 of the gasket 1504 is aligned with at least one recess 1510 of the guide 1508, the gasket 1504 can be installed on the case lower 1502. The guide 1508 and the insertion of the at least one protrusion 1514 into the at least one recess 1510 fixes the gasket 1504 in place relative to the case lower 1502.

The gasket 1504 and the seal 1516 are described as individual elements, however in this form they are combined as a single element. During production, the gasket 1504 and the seal 1516 can be produced as a single element using a double injection molding technique (2K or two-shot molding). 2K molding is a manufacturing process in which a complicated molded part can be produced by a single molding machine use two different materials. In this embodiment, the gasket 1504 is molded from PP-GF material, however in other variations the gasket 1504 may be molded from ASA, ABS, PMMA or any other material which may be molded as part of a 2K process. Additionally in this embodiment, the seal 1516 is molded from TPE material, however in other variations the seal 1516 may be molded from silicone, PVC, or any other material which may be molded as part of a 2K process.

Figure 16:
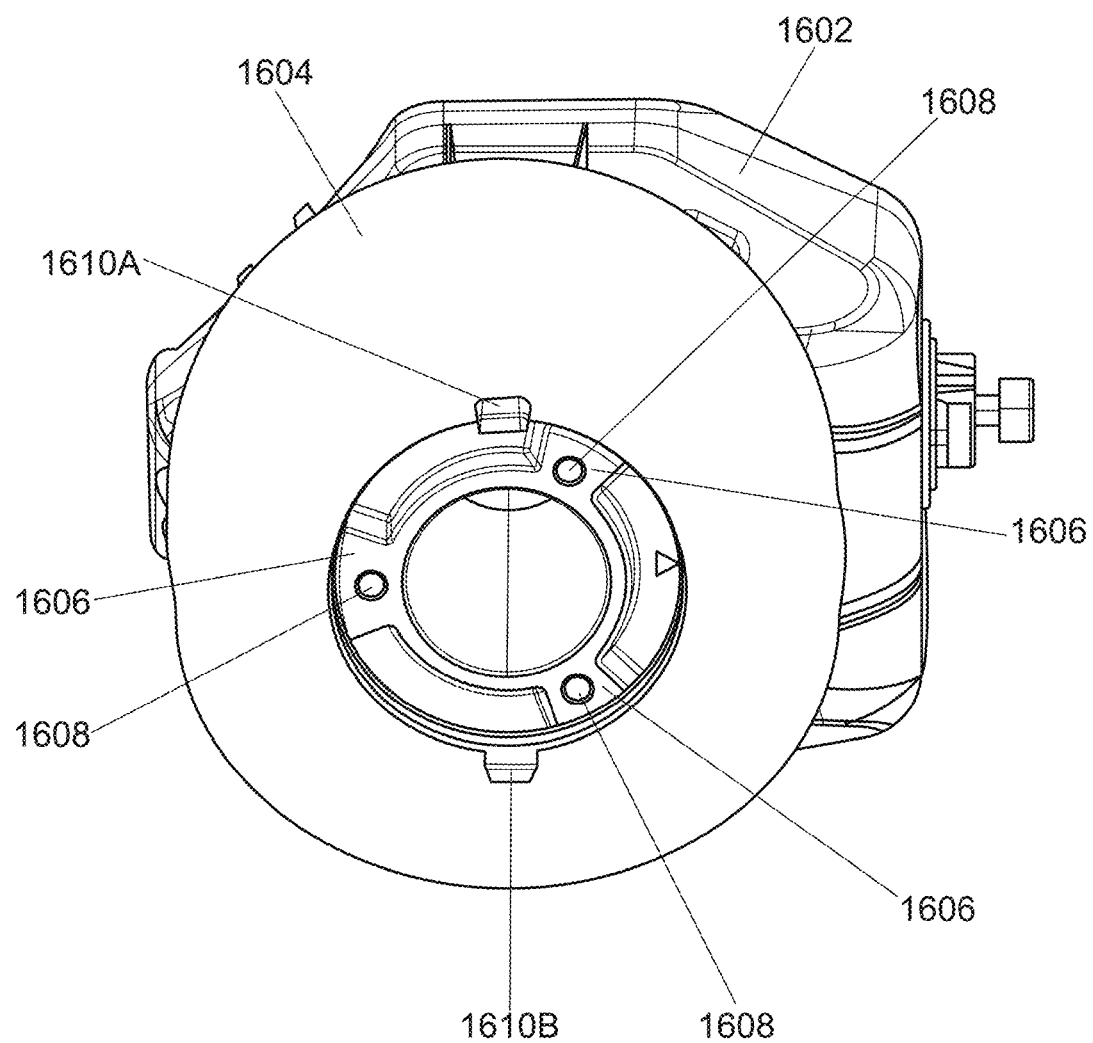
FIG. 16 illustrates a bottom view of an actuator and a shroud of a rear view device in accordance with aspects of the present disclosure.

FIG. 16 illustrates a bottom view of an actuator 1602 and a shroud 1604 in accordance with aspects of the present disclosure. The actuator 1602 includes an extension 1606 and an at least one aperture 1608, where in this embodiment, the at least one aperture 1608 includes three apertures. The shroud 1604 includes a first protrusion 1610A and a second protrusion 1610B. The extension 1606 is operable to be received within a recess of a base frame (not shown) that has a corresponding geometry. The matching geometries ensures the correct alignment between the actuator 1602 and the mirror base. The at least one aperture 1608 is operable to receive a fastener (not shown) in order to fix the actuator 1602 to the base frame of the rear view device. The shroud 1604 is attached to the actuator 1602 as described above in FIGS. 5A-B and for purposes of brevity, will not be described here again. The protrusions 1610A, 1610B extend through the aperture 1506 of the case lower 1502 of FIG. 15 when the actuator 1602 is arranged on the case lower 1502.

In this embodiment, the shroud 1604 is molded from PBT-GF material, however in other variations the shroud 1604 may be molded from ASA, ABS, PMMA or any other material which may be molded.

Figure 17A:
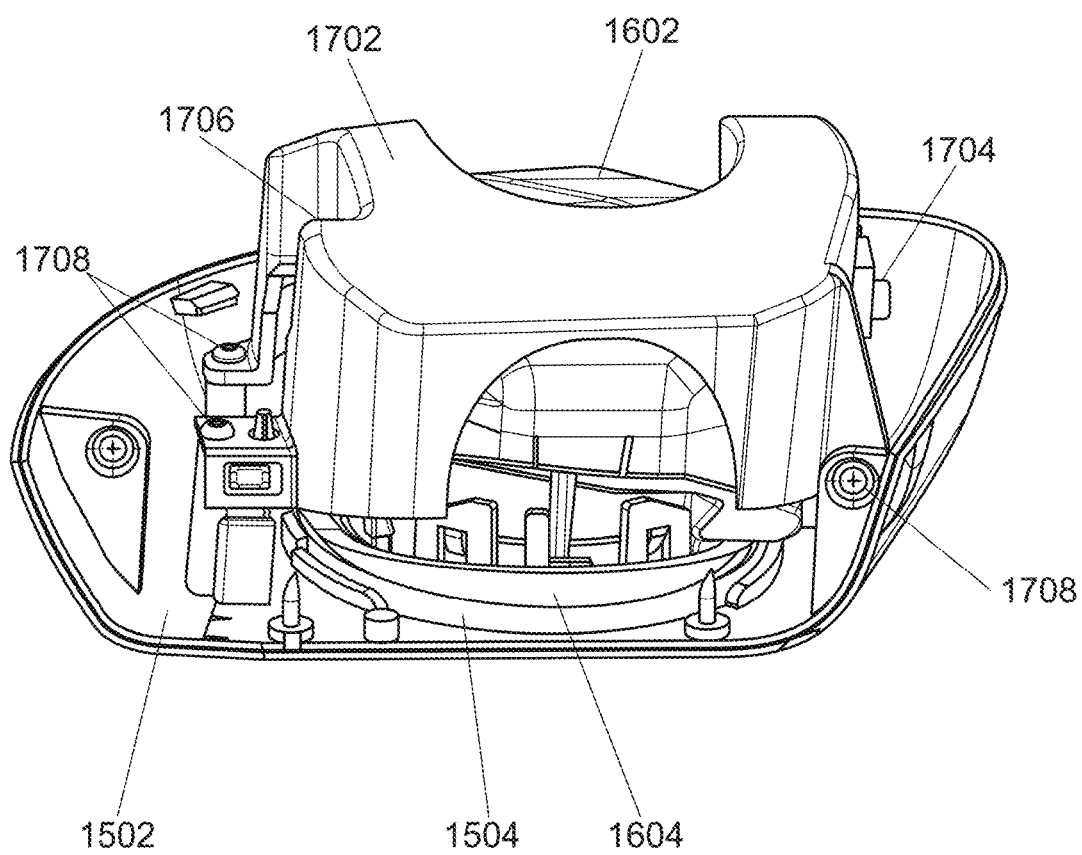
FIG. 17A illustrates a top-down view of the actuator of FIG. 16 fixed to a case lower in accordance with aspects of the present disclosure.
Figure 17B:
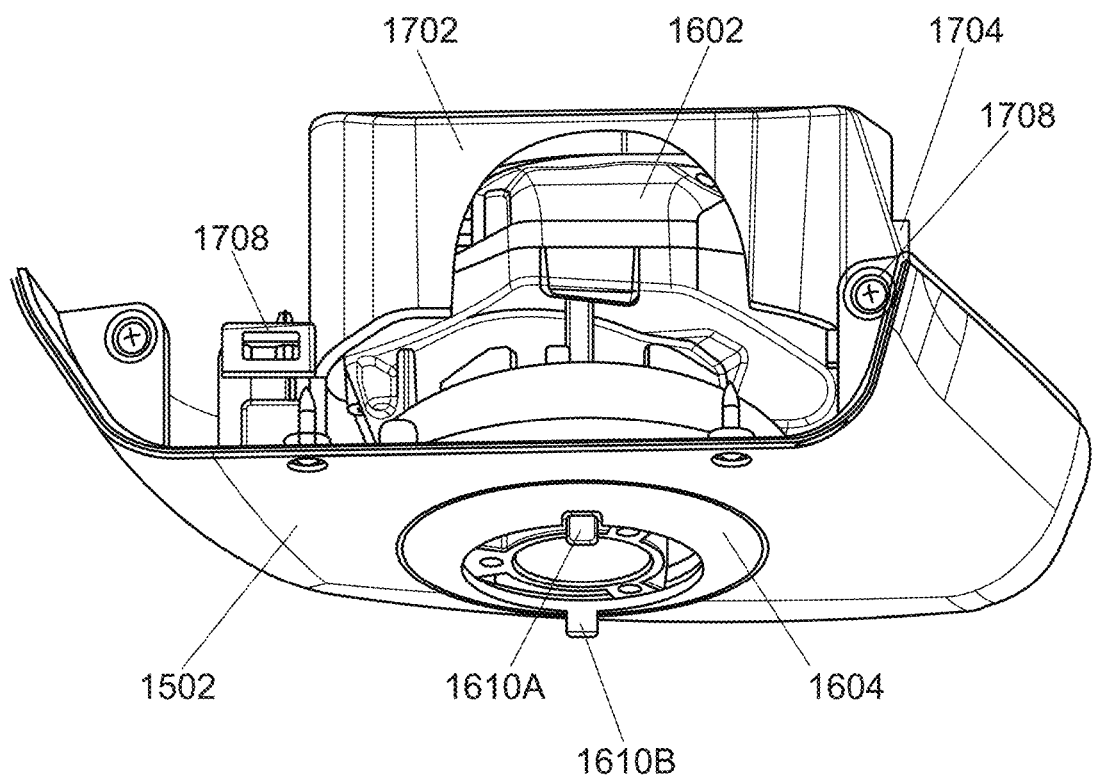
FIG. 17B illustrates a bottom-up view of the actuator fixed to the case lower of FIG. 17A.

FIG. 17A illustrates a top-down view and FIG. 17B illustrates a bottom-up view of the actuator 1602 fixed to the case lower 1502 in accordance with aspects of the present disclosure. As shown in FIG. 17A, the case frame 1702 has a first attachment element which in this variation is attachment point 1704, and a second attachment element which in this variation is attachment point 1706. The case frame 1702 is attached to the actuator 1602 via the attachment points 1704, 1706, where the first attachment point 1704 attaches to the tilt axle 532 of the actuator as explained with respect to FIG. 5 and the attachment point 1706 attaches to the interleaved hinge 506 as explained with respect to FIG. 5. The case frame 1702 is attached to the actuator 1602 via the first attachment point 1704 and the second attachment point 1706 as described above with respect to FIGS. 5-14B, and for purposes of brevity the details of those methods will not be discussed again here.

The actuator 1602 is then arranged onto the case lower 1502 such that the shroud 1604 abuts the seal 1516 of the gasket 1504. Once the shroud 1604 abuts the seal 1516 (not shown), the case frame 1702 may be attached to the case lower 1502 via the mounting points 1708. Since the case frame 1702 is attached to the actuator 1602, when the case frame 1702 is further fixed to the case lower 1502, the actuator 1602 is also coupled to the case lower 1502 keeping the shroud 1604 in abutment with the seal 1516 of the gasket 1504. The abutment between the shroud 1604 and the seal 1516 seals and prevents the intrusion of contaminants such as water, dust, salt, or other fluid or debris into the mirror head.

Referring to FIG. 17B, it can be seen that, when the actuator 1602 is attached to the case lower 1502, the first and second protrusions 1610A, 1610B extend through the aperture 1506 of the case lower 1502. Additionally, the extension 1606 of the shroud 1604 and the at least one aperture 1608 are accessible through the aperture 1506 of the case lower 1502 for attachment to a mirror base (not shown).

In this embodiment, the shroud 1604 abuts the seal 1516 of the gasket 1504. As described above with respect to FIGS. 2-14B, the actuator 1602 is operable to rotate the case lower 1502 along two separate axes, which also in this embodiment are the axis 202 and the axis 302. During rotation around the axis 202, both the shroud 1604 and the case lower 1502 rotate simultaneously with the actuator 1602. During the rotation around the axis 202, there is no relative movement between the shroud 1604 and the case lower 1502 or between the shroud 1604 and the seal 1516 and the gasket 1504.

During the rotation of the case lower 1502 about the axis 302, the shroud 1604 remains static as it is fixedly attached to the actuator 1602. As the case lower 1502 rotates so does the gasket 1504, which results in the seal 1516 moving across the surface of the shroud 1604. Since the seal 1516 and the shroud 1604 are in abutment, the materials chosen for the seal 1516 and the shroud 1604 therefore affect the ability of the case lower 1502 to be rotated about the axis 302 by the actuator 1602. The material of the shroud 1604 and the seal 1516 can be chosen to increase or decrease the ability of the actuator 1602 to rotate the case lower 1502 about the axis 302.

Additionally, the requirements by a manufacturer or customer for the surface of the shroud 1604 may lead to a material being used that is not suitable for the actuator 1602. By having the shroud 1604 separate from the actuator 1602, these surface requirements may be met without impeding the integrity or functionality of the actuator 1602.

The attachment of the actuator 1602 to a mirror base will now be described with reference to FIGS. 18-20.

Figure 18:
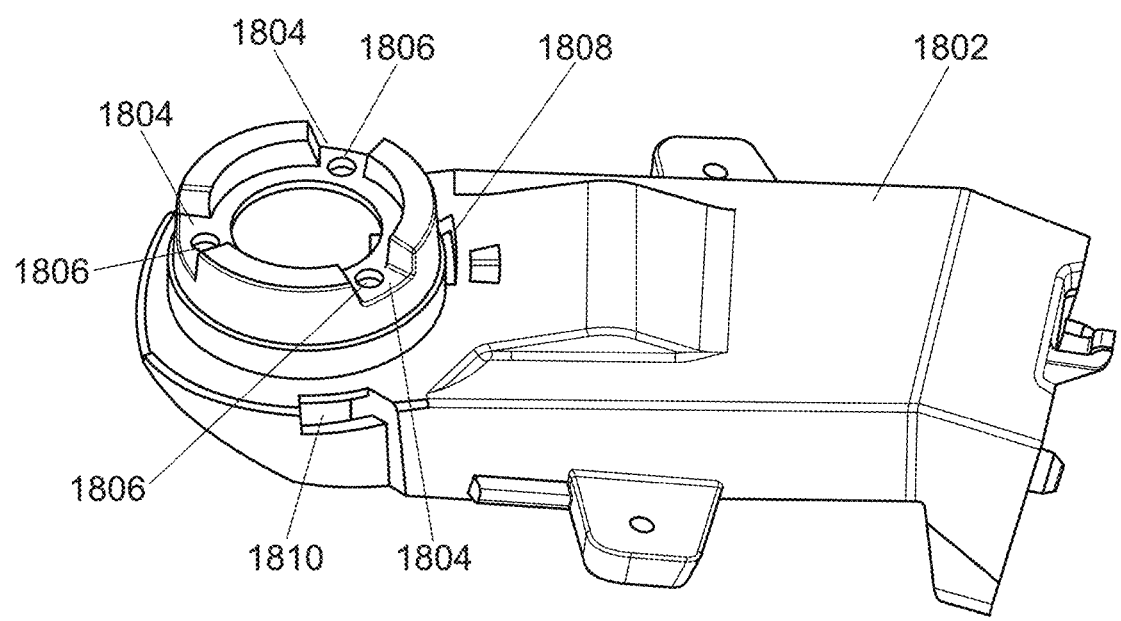
FIG. 18 illustrates a base frame of a rear view device in accordance with aspects of the present disclosure.

FIG. 18 illustrates a mirror base with a base frame 1802 in accordance with aspects of the present disclosure. As shown, the base frame 1802 includes one or more recesses 1804, at least one aperture 1806, and a protrusion 1808. Each recess 1804 has a contour that matches the contour of the extension 1606 of the actuator 1602 such that when the actuator 1602 is arranged on the base frame 1802, the matching contours encourages the alignment of the at least one aperture 1806, where in this embodiment the at least one aperture 1806 includes three apertures of base frame 1802 matching with apertures 1608 of the actuator 1602. The alignment between the apertures 1806, 1608 allows for the insertion of a fastener in order to fixedly attach the actuator 1602 to the base frame 1802. In this embodiment, the fastener used to fixedly attach the actuator 1602 to the base frame 1802 is a bolt (not shown). However, in other variations, the fastener used may be a pin, weld, clip or any other fastener or fastening method that can fixedly attach the actuator 1602 to the base frame 1802. The aperture 1810 is provided on the base frame 1802 as an attachment point for a breakface gasket (not shown).

Figure 19:
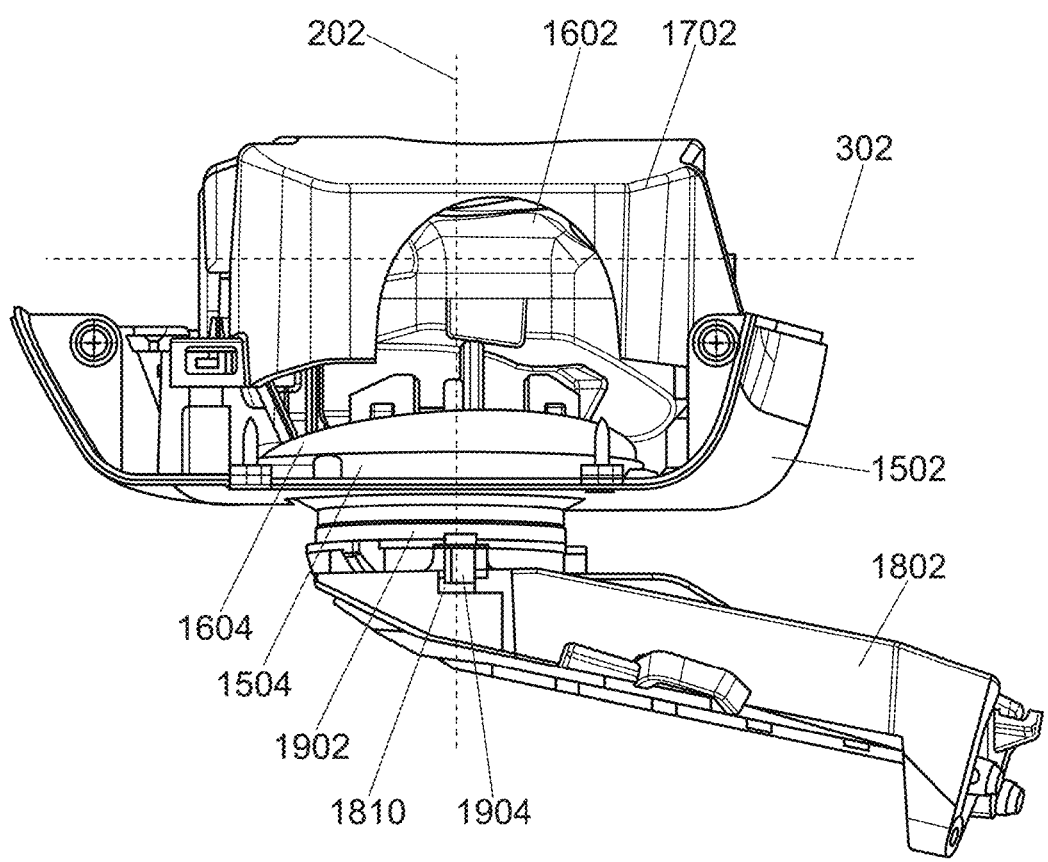
FIG. 19 illustrates a front view of the actuator of FIG. 17A attached to the base frame of FIG. 18 in a nominal position.

FIG. 19 illustrates a front view of the actuator 1602 attached to the base frame 1802 in a nominal position in accordance with aspects of the present disclosure. As shown in FIG. 19, the base frame 1802 is provided with a breakface gasket 1902. The breakface gasket 1902 includes a fastener 1904, which in this example variation is a clip, insert into the aperture 1810 of the base frame 1802. The fastener 1904 inserted into the aperture 1810 fixedly secures the breakface gasket 1902 to the base frame 1802. When the actuator 1602 is attached to the base frame 1802, the breakface gasket 1902 abuts the shroud 1604 in order to seal the gap between the base frame 1802 and the actuator 1602. Additionally, the case frame 1702 is coupled to the actuator 1602 as well as the case lower 1502 so that the shroud 1604 abuts the seal 1516 of the gasket 1504. Further, the actuator 1602 has been attached to the base frame 1802 by first aligning the extension 1606 of the actuator 1602 with the recess 1804 of the base frame 1802. Once aligned, a fastener (not shown) is insert through the at least one aperture 1806 and into the at least one aperture 1608 to fixedly attach the actuator 1602 to the base frame 1802.

The inclusion of the gasket 1504 and the breakface gasket 1902 into the rear view device using the actuator 1602 improves the vibrational frequency of the rear view device. Without the gasket 1504 or the breakface gasket 1902, the only support between the base frame 1802 and the actuator 1602 would be between the extensions 1606 of actuator 1602 and the recesses 1804 of the base frame 1802. Fasteners would additionally be inserted through the at least one aperture 1806 of the base frame 1802 and into the at least one aperture 1608 of the actuator 1602 in order to fix the actuator 1602 to the base frame 1802. The arrangement of the extensions 1606 and recesses 1804 as well as the insertion of the fasteners into the at least one aperture 1608 and the at least one aperture 1806 would primarily provide support along the axis 202, while providing very little structural support along the axis 302.

The abutment between the shroud 1604 and the breakface gasket 1902 as well as the abutment between the shroud 1604 and the seal 1516 of the gasket 1504 provides additional support along the axis 202 as well as the axis 302. This additional support along the axis 302 will reduce the vibration amplitude of the case lower 1502 as well as any other elements attached to the case lower 1502, which in this embodiment includes a mirror reflective element (not shown).

Figure 20:
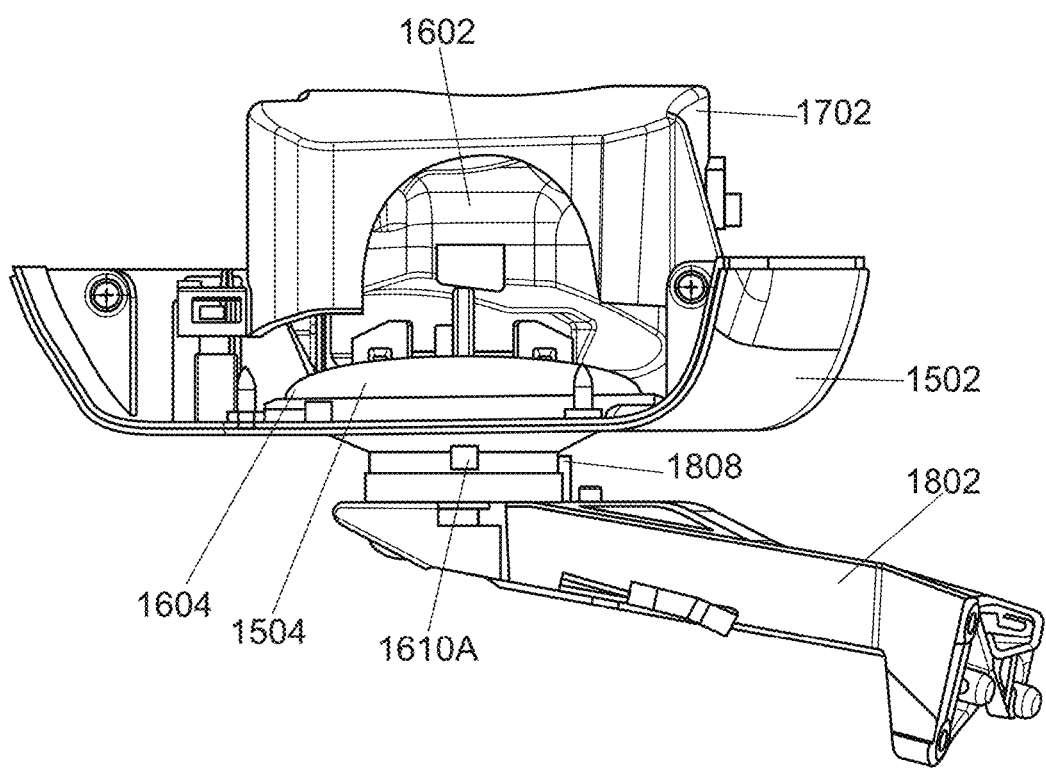
FIG. 20 illustrates an assembly similar to FIG. 19, but with a breakface gasket removed.

FIG. 20 illustrates the assembly of FIG. 19 with the breakface gasket 1902 removed for the purposes of clarity.

When the actuator 1602 is fixedly attached to the base frame 1802, the protrusion 1610A and the protrusion 1610B (not shown) of the shroud 1604 extend through the case lower 1502 towards the base frame 1802 until they are in the same plane as the protrusion 1808. With the protrusion 1610A, the protrusion 1610B, and the protrusion 1808 in the same plane, they may interact with each other to prevent continued travel of the mirror head during rotation from an impact. Further description of the protrusion 1610A, the protrusion 1610B, and the protrusion 1808 acting as hard stops to prevent rotation during an impact will now be discussed with additional reference to FIGS. 21A-22B.

Figure 21A:
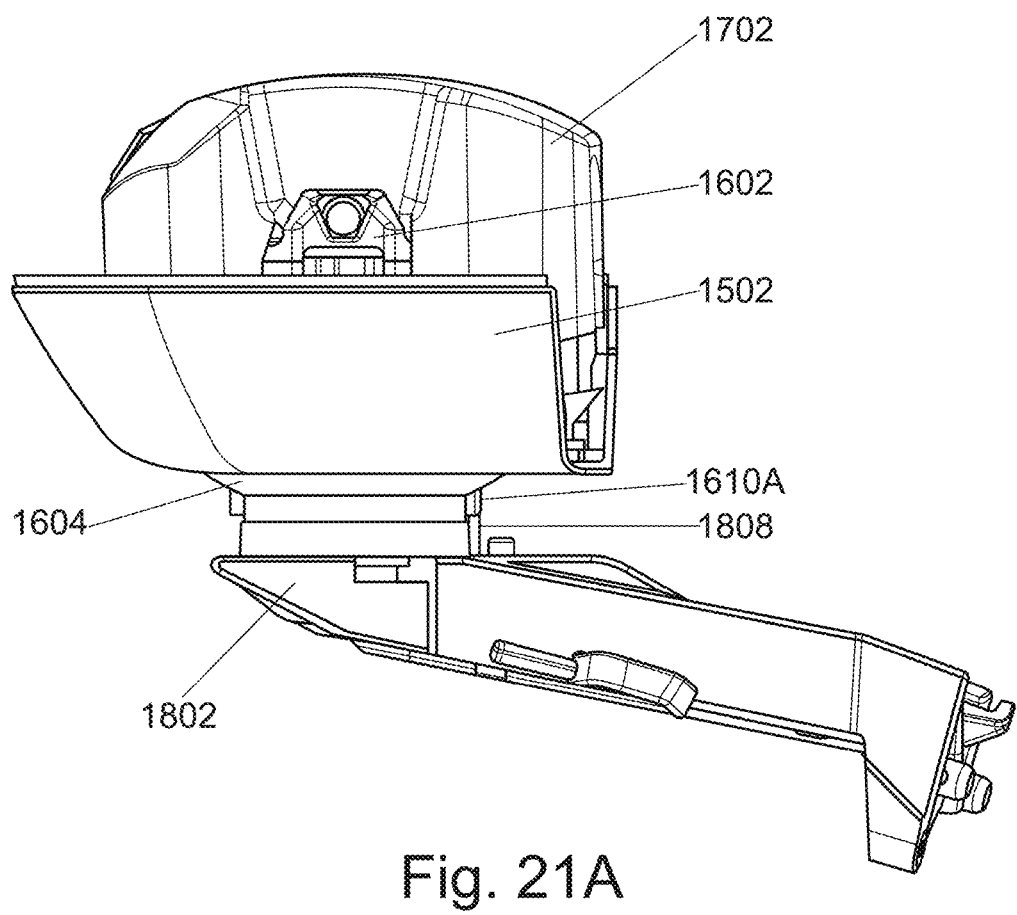
FIG. 21A illustrates a front view of the shroud of FIG. 16 hitting a hard stop in the rearward direction.
Figure 21B:
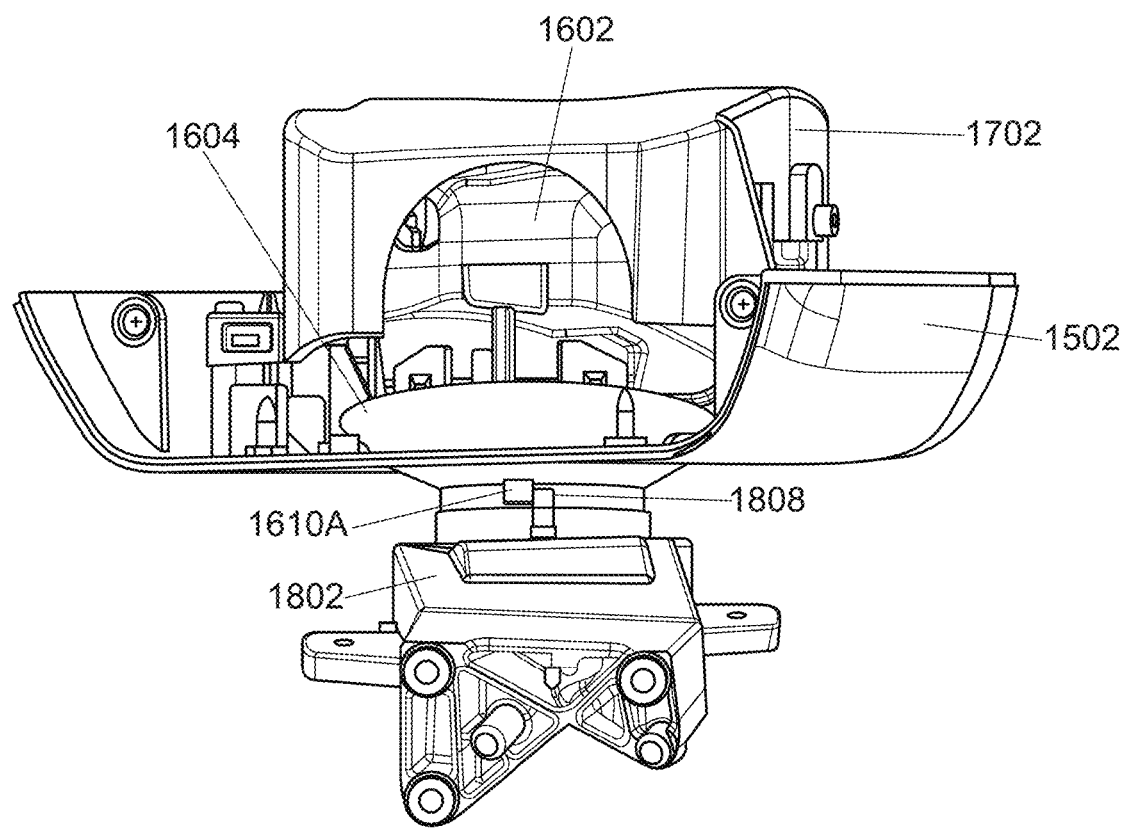
FIG. 21B illustrates a side view of the shroud of FIG. 16 hitting a hard stop in the rearward direction.

FIG. 21A illustrates a front view of the shroud 1604 hitting a hard stop in the rearward direction in accordance with aspects of the present disclosure. FIG. 21B illustrates a side view of the shroud hitting a hard stop in the rearward direction in accordance with aspects of the present disclosure. For purposes of clarity, the breakface gasket 1902 has been removed from FIGS. 21A-B.

As shown in FIGS. 21A-B, when a force is applied to a portion of a mirror head, which in this example is represented by the case lower 1502, the force applied will cause the entire mirror head to rotate. In this embodiment, the force applied to the case lower 1502 rotates the mirror head towards the rear of the equipped vehicle. Since the actuator 1602, the shroud 1604, and the case frame 1702 are fixedly attached to the case lower 1502 they will rotate as the case lower 1502 rotates. The case lower 1502 will continue to rotate until the protrusion 1610A of the shroud 1604 abuts the protrusion 1808 of the base frame 1802. The abutment between the protrusion 1610A and the protrusion 1808 acts as a hard stop and prevents further rotation of the case lower 1502.

Figure 22A:
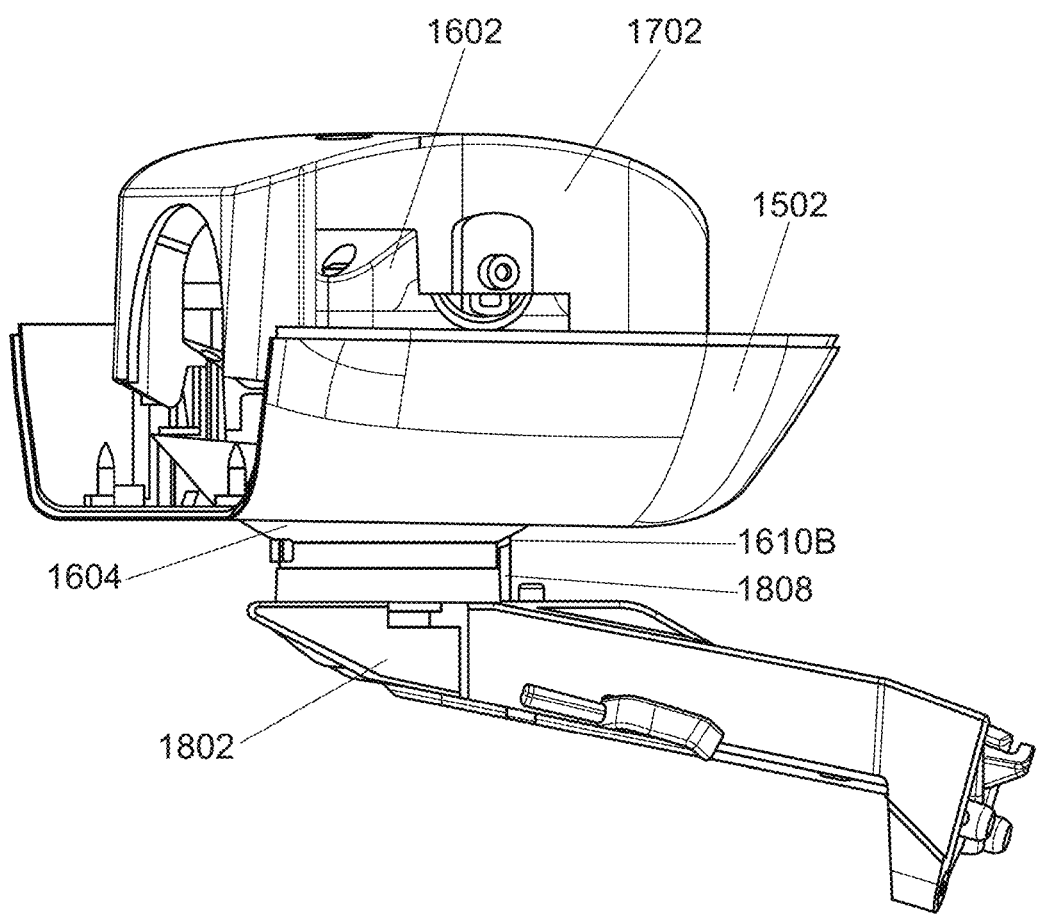
FIG. 22A illustrates a front view of the shroud of FIG. 16 hitting a hard stop in the forward direction.
Figure 22B:
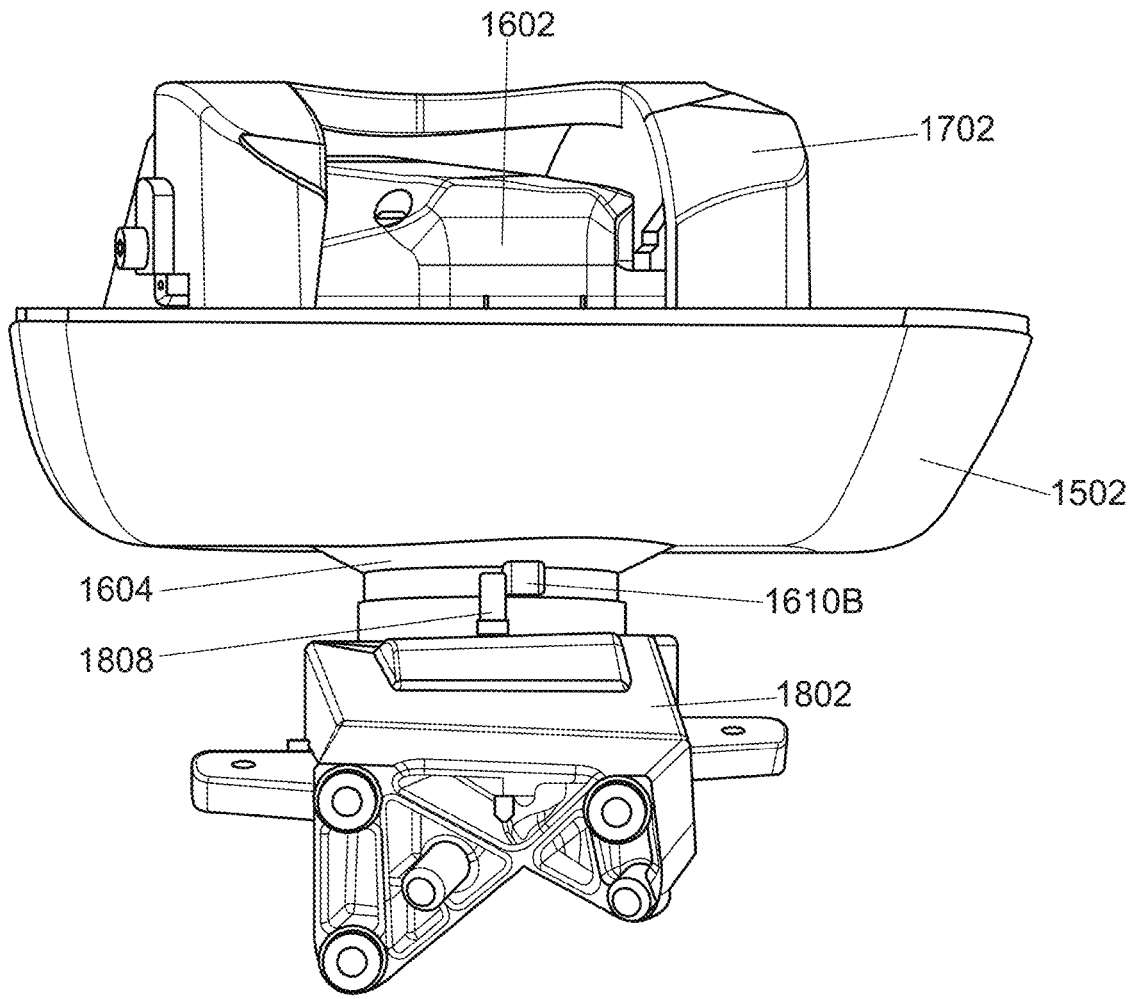
FIG. 22B illustrates a side view of the shroud of FIG. 16 hitting a hard stop in the forward direction.

FIG. 22A illustrates a front view of the shroud 1604 hitting a hard stop in the forward direction in accordance with aspects of the present disclosure. FIG. 22B illustrates a side view of the shroud 1604 hitting a hard stop in the forward direction in accordance with aspects of the present disclosure. For purposes of clarity, the breakface gasket 1902 has been removed from FIGS. 22A-B. Similar to FIGS. 21A-B above, when a force is applied to a portion of a mirror head, the force applied will cause the entire mirror head to rotate. In this embodiment, the force applied to the case lower 1502 rotates the mirror head towards the front of the equipped vehicle. Since the actuator 1602, the shroud 1604, and the case frame 1702 are fixedly attached to the case lower 1502, they will rotate as the case lower 1502 rotates until the protrusion 1610B of the shroud 1604 abuts the protrusion 1808 of the base frame 1802. The abutment between the protrusion 1610B and the protrusion 1808 acts as a hard stop and prevents further rotation of the case lower 1502.

The operation of the actuator 1602 moving a mirror head along two different axes is identical to the operation of the actuator 402 discussed above with respect to FIGS. 2A-14B. The actuator 1602 is operable to adjust the mirror head along two separate axes to perform both a tilt function and fold function. In this embodiment, the actuator 1602 performs a folding function around the axis 202 and a tilt function around the axis 302. The protrusion 1808 is arranged on the base frame 1802 and is fixed in place relative to the axis 202 and the axis 302, while the protrusion 1610A and the protrusion 160B of the shroud 1604 are fixed only along the axis 302. Therefore, when the actuator 1602 starts rotating, the shroud protrusions 1610A, 1610B rotate as well. The actuator 1602 will continue rotating until there is a flush contact between the protrusion 1610A or the protrusion 1610B and the protrusion 1808.

If the protrusion 1610A and the protrusion 1610B were not fixed along the axis 302, the protrusion 1610A or the protrusion 1610B could be rotated along the axis 302 such that they longer made a flush contact with the protrusion 1808 during rotation around the axis 202. As an example, if the protrusion 1610A were moved from the shroud 1604 and arranged on the case lower 1502 such that it was able to contact the protrusion 1808, any rotation of the case lower about the axis 302 would result in a non-flush contact between the protrusion 1610A and the protrusion 1808 as the case lower 1502 was rotated around the axis 202. Non-flush contact between the protrusion 1610A and the protrusion 1808 could result in damage to either part such as increase wear or shorter lifespan, and could possibly lead to damage of other parts of the rear view device due to a lack of hard stop functionality.

As described in FIGS. 21A-22B, the protrusion 1610A and the protrusion 1610B are arranged on the shroud 1604 such that they act as a hard stop in a first direction or a second direction. In this embodiment, the first direction is towards the rearward of the vehicle and the second direction is toward the forward of the vehicle. Further, in this embodiment, the protrusion 1610A and the protrusion 1610B are arranged on the shroud 1604 such that they contact the protrusion 1808 after 70 degrees of rotation. After rotating 70 degrees in the rearward or forward direction from a nominal position, the protrusion 1610A or the protrusion 1610B will contact the protrusion 1808 to prevent further rotation. However, depending on the manufacturer or customer, a different angle of rotation may be required. Still further in this embodiment, a different shroud can be attached to the actuator that has the protrusion 1610A and the protrusion 1610B arranged in different locations such that the protrusion 1610A contacts the protrusion 1808 after 80 degrees of rotation in the rearward direction and the protrusion 1610B contacts the protrusion 1808 after 60 degrees of rotation in the forward direction. A shroud may be produced with the protrusion 1610A and the protrusion 1610B arranged to act as a hard-stop after any angle that may be requested by a customer. In this manner, it possible to use a single actuator for all rear view devices, while only changing the shroud to deliver the rear view device with different maximum degrees of rotation.

Figure 23:
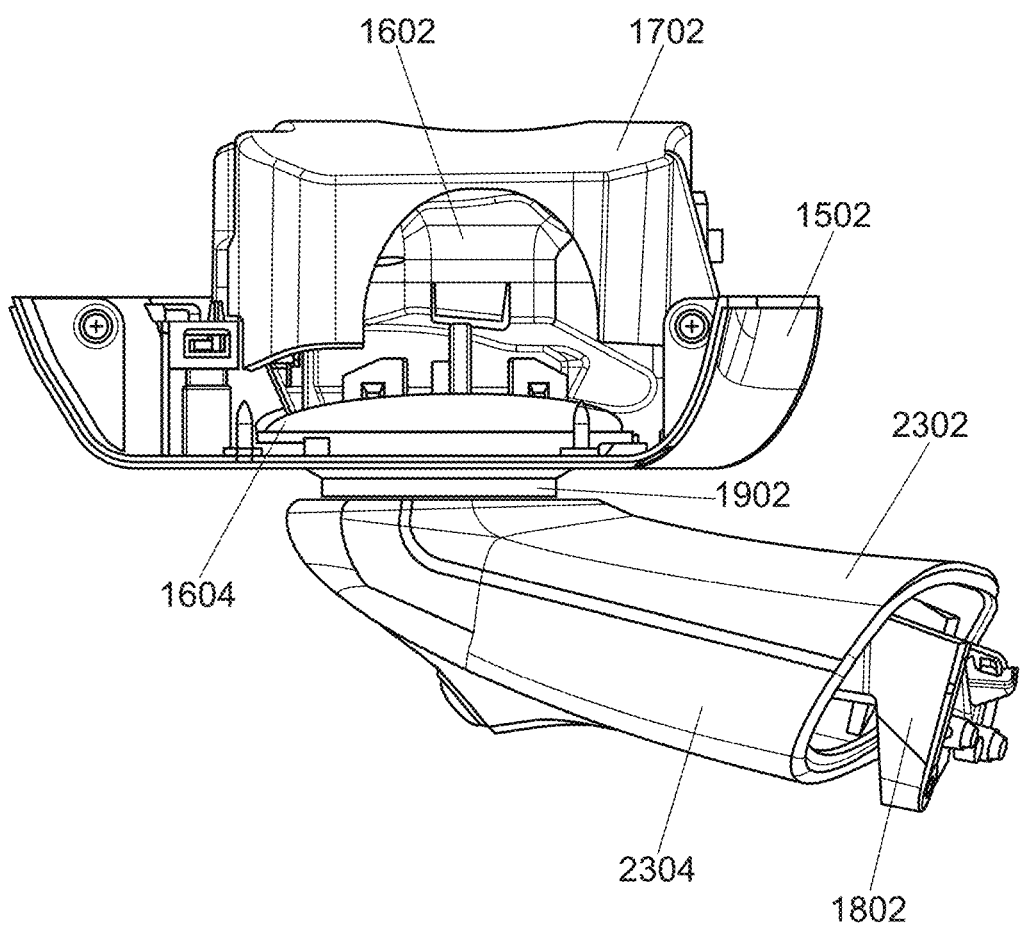
FIG. 23 illustrates a base cover of a rear view device in accordance with aspects of the present disclosure.

FIG. 23 illustrates a base cover of a rear view device in accordance with aspects of the present disclosure, with an upper base cover 2302 and a lower base cover 2304 attached to the base frame 1802. When attached to the base frame 1802, the upper edge of the upper base cover 2302 and the lower base cover 2304 abut the breakface gasket 1902, creating a seal that prevents the intrusion of particles or contaminants from entering the rear view device through the gap between the breakface gasket 1902 and the base frame 1802.

In the previous embodiments, a shroud has been provided for use with an actuator wherein the shroud is fixedly attached to the actuator. In this arrangement, the shroud travels with the actuator, however in other variations, a shroud may be provided that is static and not attached to an actuator. A static shroud 2402 will now be discussed with reference to FIG. 24A/B.

Figure 24A:
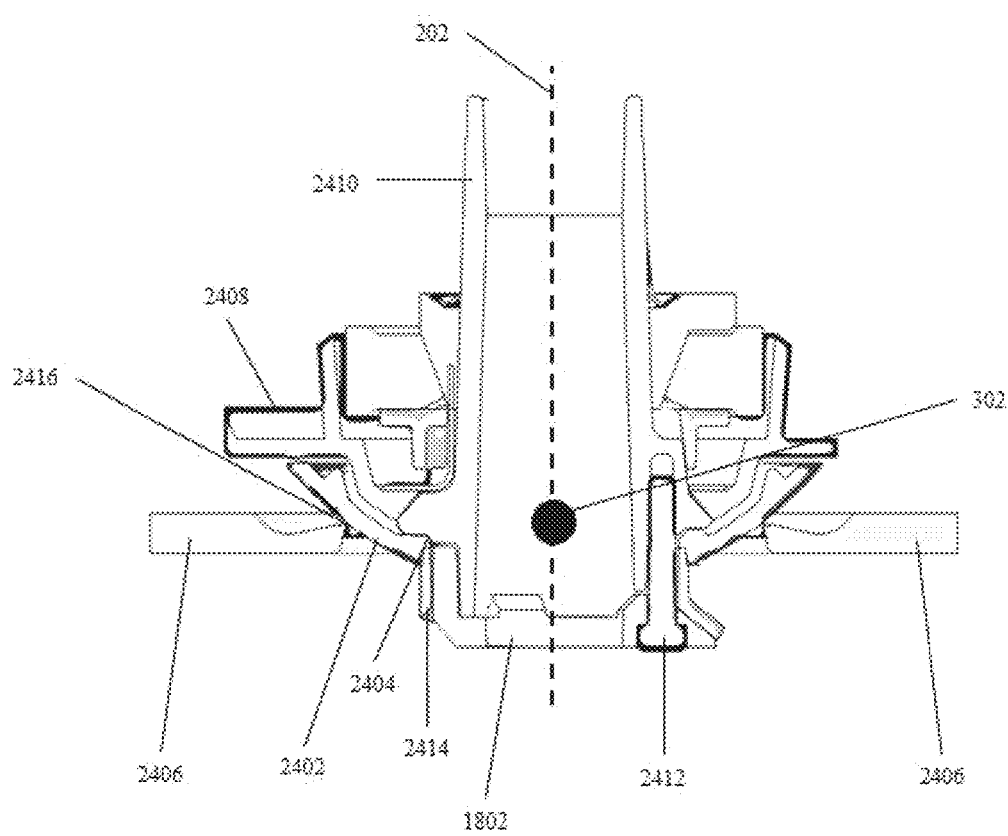
FIG. 24A illustrates a static shroud of a rear view device in accordance with aspects of the present disclosure.

FIG. 24A illustrates the static shroud 2402 for a rear view device in accordance with aspects of the present disclosure. As shown in FIG. 24A, the base frame 1802 is provided with the shroud 2402. The shroud 2402, is clamped between the base frame 1802 and a shaft 2410 of an actuator 2408 as shown at point 2404. Once clamped between the base frame 1802 and the shaft 2410, a fastener 2412 can be inserted through the base frame 1802 and into the shaft 2410 in order to fix the shroud 2402 and the shaft 2410 to the base frame 1802. With the shroud 2402 fixed in place, a seal is created between the shroud 2402 and a base cover 2414 as well as between the shroud 2402 and the mirror head 2406, which prevents the intrusion of contaminants such as water, dust, salt, or other fluid or debris into the mirror head 2406.

During operation, the actuator 2408 may rotate the mirror head 2406 about the axis 202 or the axis 302 as described with respect to FIGS. 1-14B. During the rotation around the axis 202, the mirror head 2406 now rotates relative to the shroud 2402. Since the mirror head 2406 is rotating around the axis 202 and the shroud 2402 is remaining static, the mirror head 2406 will contact the shroud 2402 at a contact point 2416 around the circumference of the shroud 2402.

Figure 24B:
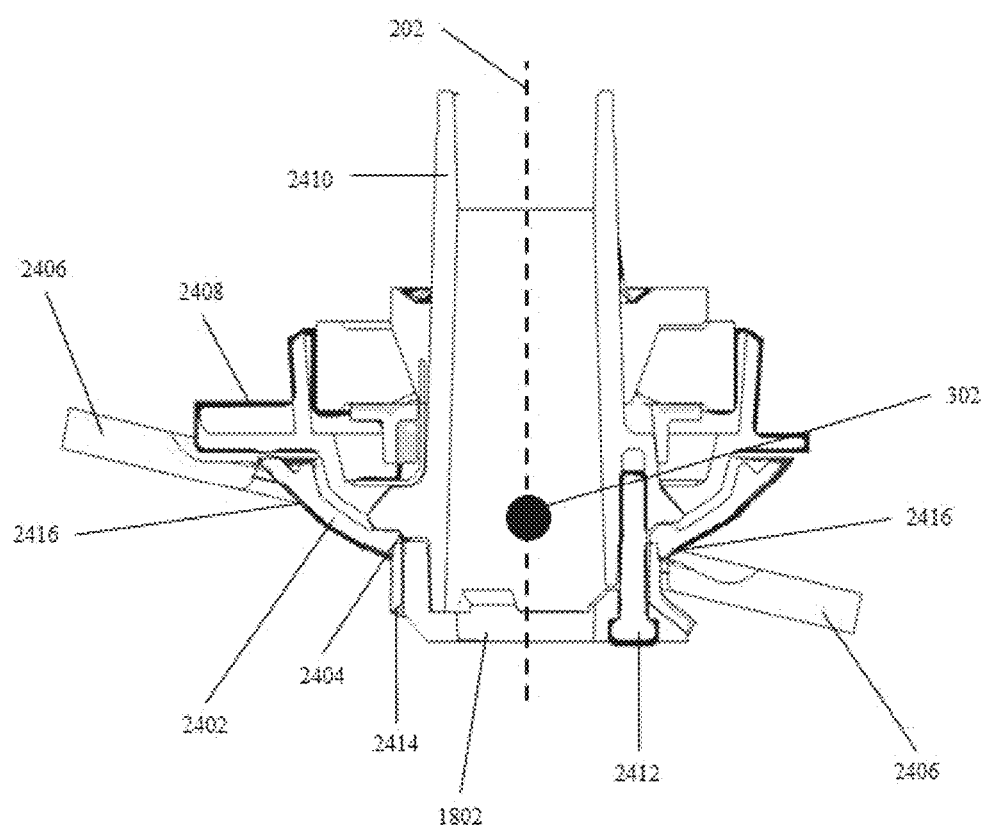
FIG. 24B illustrates the rotation of a mirror head around the static shroud of FIG. 24A.

FIG. 24B illustrates the rotation of the mirror head 2406 around the static shroud 2402 in accordance with aspects of the present disclosure. During operation, the actuator 2408 may be required to rotate the mirror head 2406 about the axis 302 as described above with respect to FIGS. 1-14B. The operation of the mirror head 2406 rotating about the axis 302 is identical whether a static shroud or a shroud attached to an actuator is used. As the mirror head 2406 rotates about the axis 302, the case lower 602, 1502 of mirror head 2406 traverses up one side of the shroud 2402 and down the opposing side of the shroud 2402. During the rotation about the axis 302, the mirror head 2406 remains in contact as shown by the contact point 2416 around the circumference of the shroud 2402.

Figure 25A:
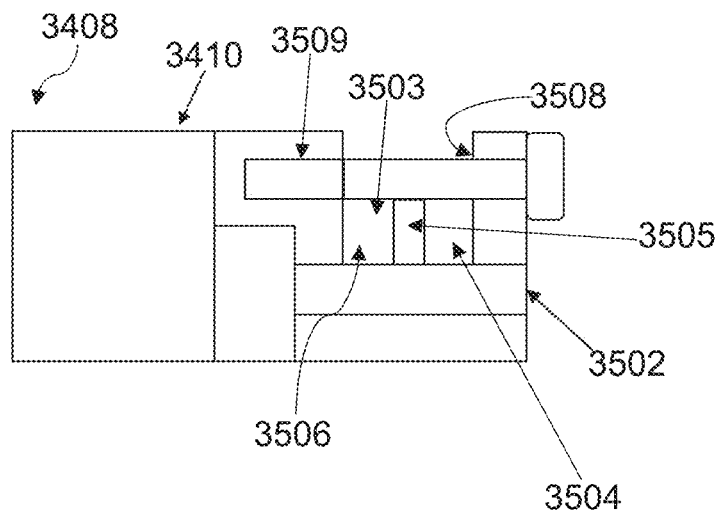
FIG. 25A is a schematic cross-section through a part of an actuator of a rear view device in accordance with aspects of the present disclosure.
Figure 25B:
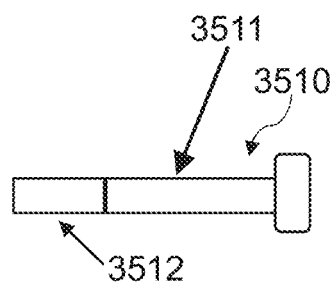
FIG. 25B is a schematic representation of tail pin to be inserted into the actuator of FIG. 25A.

FIGS. 25A, 25B illustrate an alternative hinge 3506 provided by the upper housing 3502 of an actuator 3408, the shaft 3410 of which also being shown. The hinge 3506 comprises two recesses 3503, 3504 on both sides of a projection 3505, and being arranged between two walls of the upper housing 3502, with the walls and the projection 3505 acting as the webs discussed above. But for facilitating the introduction of a tail pin 3510, the upper housing 3502 provides a single opening 3508 for inserting the tail pin 3510 such that a tilt bearing surface 3511 of the tail pin 3510 is supported by the projection 3505, whereas a screw area 3512 of the tail pin 3510 is adapted to be screwed into a further opening 3509 of the upper housing 3502 provided with an internal thread. This construction not only facilitates the insertion of the tail pin 3510, but at the same time also provides sufficient strength of the connection by making usage of the screw area 3512.

Figure 26A:
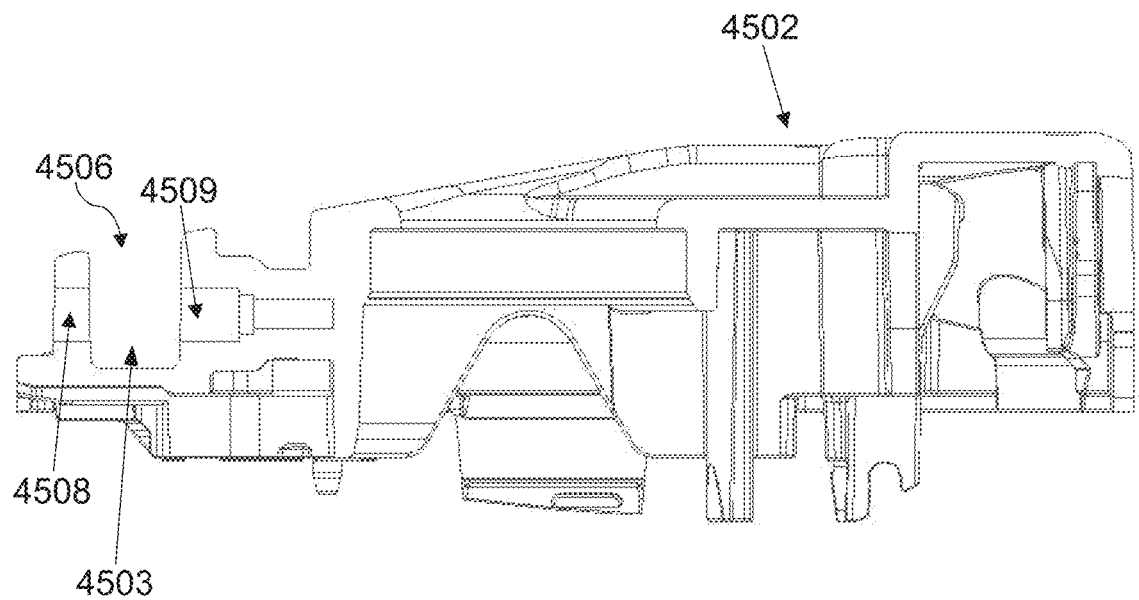
FIG. 26A is a side view of an upper housing of an actuator to be used with a rearview device in accordance with aspects of the present invention.
Figure 26B:
FIG. 26B is a side view of a tail pin to be used with the upper housing of FIG. 26A.

FIGS. 26A, 26B show alternatives of FIGS. 25A, 25B. In particular, an upper housing 4502 with two walls can be seen, the first wall being provided with an opening 4508 and the second wall being provided with an opening 4509 with an internal thread. The two walls of the upper housing 4502 are arranged to leave a recess 4503 there between. A tail pin 4510 is adapted to be inserted with a tilt bearing surface 4511 into the opening 4508 and with a screw area 4511 in the opening 4509. The hinge 4506 with the two walls and the recess 4508 functions as the hinge with the webs discussed above.

The two alternative constructions of the hinge 3506, 4506 formed with the upper housing 3502, 4502 of the actuator 3408 discussed with respect to FIGS. 25A-26B, interact with complementary hinges provided by case frames (not shown) in an analogue manner as described for the embodiments shown in FIGS. 5A-24B, as more or less just the number of leaves of the interleaved hinges have been reduced for the benefit of the assembling process. Thus, the hinges 3506, 4506 each still act as an interleaved hinge allowing a tilting while also providing hard stops as described in detail with respect to FIG. 10A-10D. The number of the leaves of the hinges can vary as the recesses between neighboring leaves and the extension of the leaves control the tilting range. While e.g. FIG. 5A shows three leaves of the hinge 506 with a reduction of the extensions thereof towards the edge of the upper actuator housing 502, which leads to a sloped surface, wherein three slot like recesses are formed between said three leaves, e.g. FIG. 26A shows one leave of the hinge 4506 providing one recess 4503 which is sufficient to fulfill the above outlined functions for controlling the tilt range. The selection of the number of leaves as well as the distances between neighboring leaves, which determine the recesses, as well the heights of the leaves depends on the desired tilt range.

Figure 27:
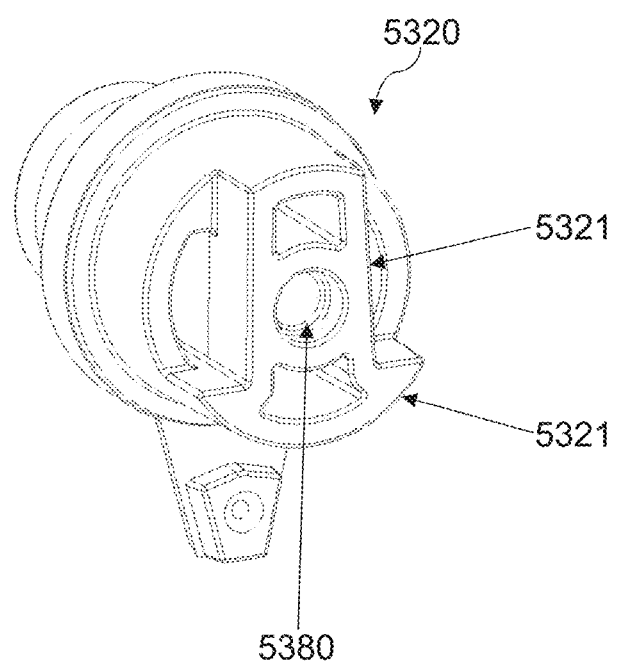
FIG. 27 is a perspective view of a tilt axle.

FIG. 27 shows an alternative tilt axle 5320 having a central aperture 5380 for inserting a fastener (not shown) as described with respect to the embodiments above. The difference between the tilt axle 5320 and the tilt axle 532 in particular shown in FIG. 5B is the geometry, in particular the cross section thereof. The tilt axle 5320 is substantially T-shaped with a tapered portion 5321 and a rounded portion 5322. This geometry secures a safe attachment and easy insertion into the respective mount either provided by a case lower (not shown) or a case frame (not shown). Said mount can be in form of a slot with a geometry complementary to the one of the tilt axle 5320.

Figure 28:
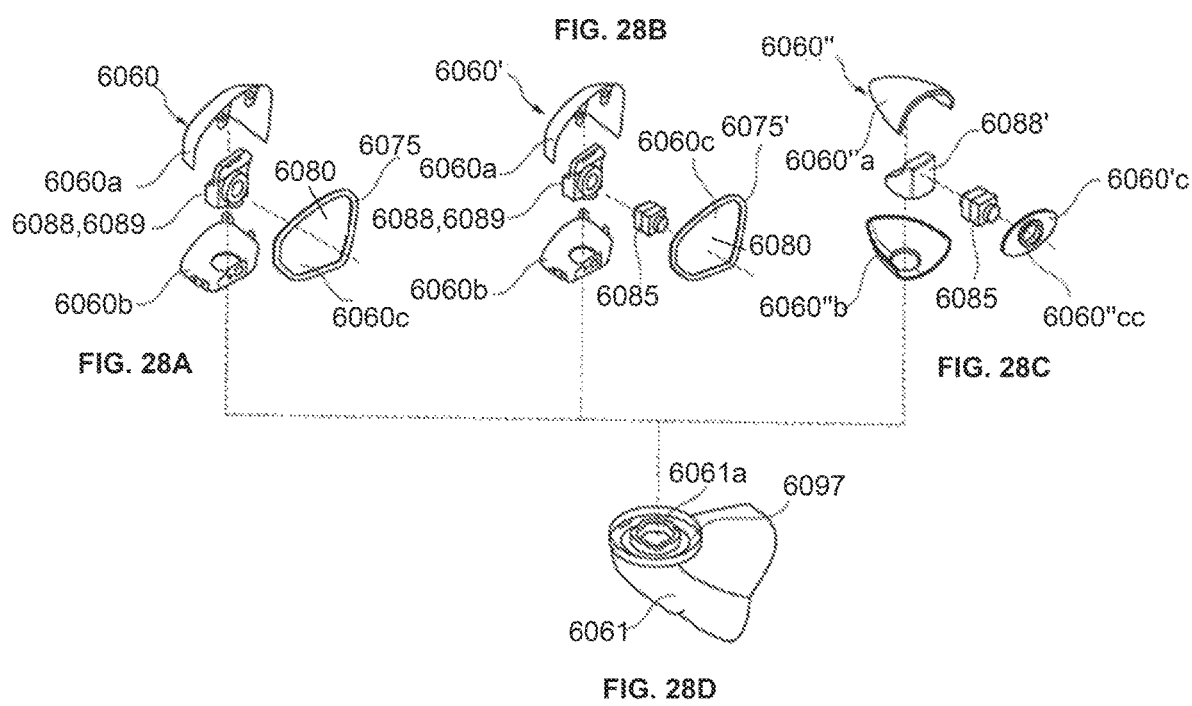
FIG. 28A is an exploded view of the head assembly of an alternative first rearview device.
FIG. 28B is an exploded view of the head assembly of an alternative second rearview device.
FIG. 28C is an exploded view of the head assembly of an alternative third rearview device.
FIG. 28D is a perspective view of the base assembly to which any one of the head assemblies of FIGS. 28A, 28B, and 28C can be attached.

FIGS. 28A to 28D show an external rearview device kit comprising three different sects of head assembly 6060, 6060' and 6060" shown in FIGS. 28A, 28B and 28C, respectively, as well as one base assembly as shown in FIG. 28D.

According to FIG. 28A the head assembly 6060 comprises a cap or upper cover 6060a, a case lower or lower cover 6060b as well as a front cover 6060c, comprising a bezel 6075 carrying a mirror glass 6080. The covers 6060a, 6060b and 6060c enclose an internal structure comprising a case frame 6088 and an articulation assembly 6089 for the mirror glass 6080.

In analogy to a head assembly 6060 of FIG. 28A which only makes usage of a mirror glass 6080, the head assembly 6060' of FIG. 28B makes usage of an upper cover 6060a, a lower cover 6060b, a front cover 6060c and an internal structure 6088, 6089. In addition, a camera 6085 is arranged between the internal structure with a case frame 6088 and an articulation assembly 6089 and the front cover 6060c. Still further, a front cover 6060c comprises a bezel 6075' which is provided with an opening in order to allow the camera 6085 to look through the mirror glass 6080.

A head assembly 6060" of FIG. 28C also makes usage of an upper cover 6060"a, a lower cover 6060"b and a front cover 6060'c enclosing an internal structure in form of a case frame 6088' with a camera 6085 to be attached to the case frame 6088' and extending through an opening 6060"cc within the front cover 6060'c. The head assembly 6060" does not comprise an articulation assembly, but only a case frame 6088' to which the camera 6085 is to be attached. Thus, no motor is needed and the head assembly 6060" is fixed relative to a base assembly 6061 when assembled.

Each of the head assembly 6060, 6060' and 6060" of FIGS. 28A, 28B and 28C can be attached to the base assembly 6061 shown in FIG. 28D via an bayonet tower 6061a and making usage of a special sealing means 6097. Further details of the attachment mechanism as well as sealing functions are described in the German application no. 10 2018 116 011 filed on Jul. 2, 2018 for SEALING MEANS, BASE ASSEMBLY WITH SUCH SEALING MEANS AND REARVIEW DEVICE WITH SUCH BASE ASSEMBLY and in the German patent application no. 10 2018 116 008 filed on Jul. 2, 2018 for BASE ASSEMBLY AND REARVIEW DEVICE THEREWITH, which are hereby incorporated by reference.

Figure 29:
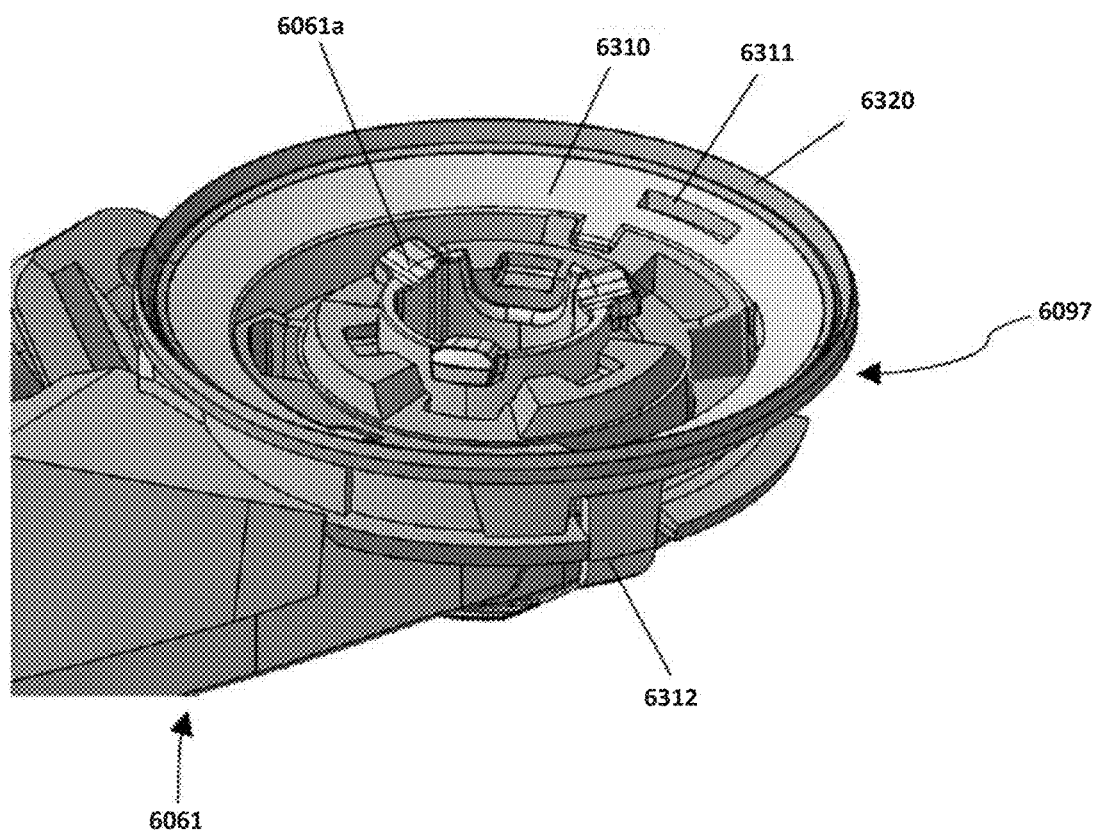
FIG. 29 is a perspective top view of an alternative base frame with a gasket.

FIG. 29 shows an alternative base assembly 6061 with a gasket 6097 and a bayonet tower 6061a. Said gasket 6097 comprises a hard part 6310 and a soft part 6320. The hard part 6310 fulfills attachment and/or holding functions as illustrated below and the soft part 6320 enables a compensation of tolerances, in addition to the gasket 6097 providing a pivot seal of a pivot joint between a base assembly and a head assembly of a rear view device. Thus, the gasket 6097 is provided in form of a two component gasket in order to provide a multitude of functions, with the hard part 6310 being provided with clips 6311, 6312 for that purpose.

These clips 6311, 6312 fulfill more than one function. On the one hand, the clips 6311, 6312 allow for a clip connection of the sealing means 6097 with the base assembly 6061, and on the other hand the clips 6311, 6312 are adapted to hold a cable for a camera attached to the base assembly 6061 and running from a camera connector into a vehicle to which the rear view device is attached at its base assembly 6061.

Figure 30:
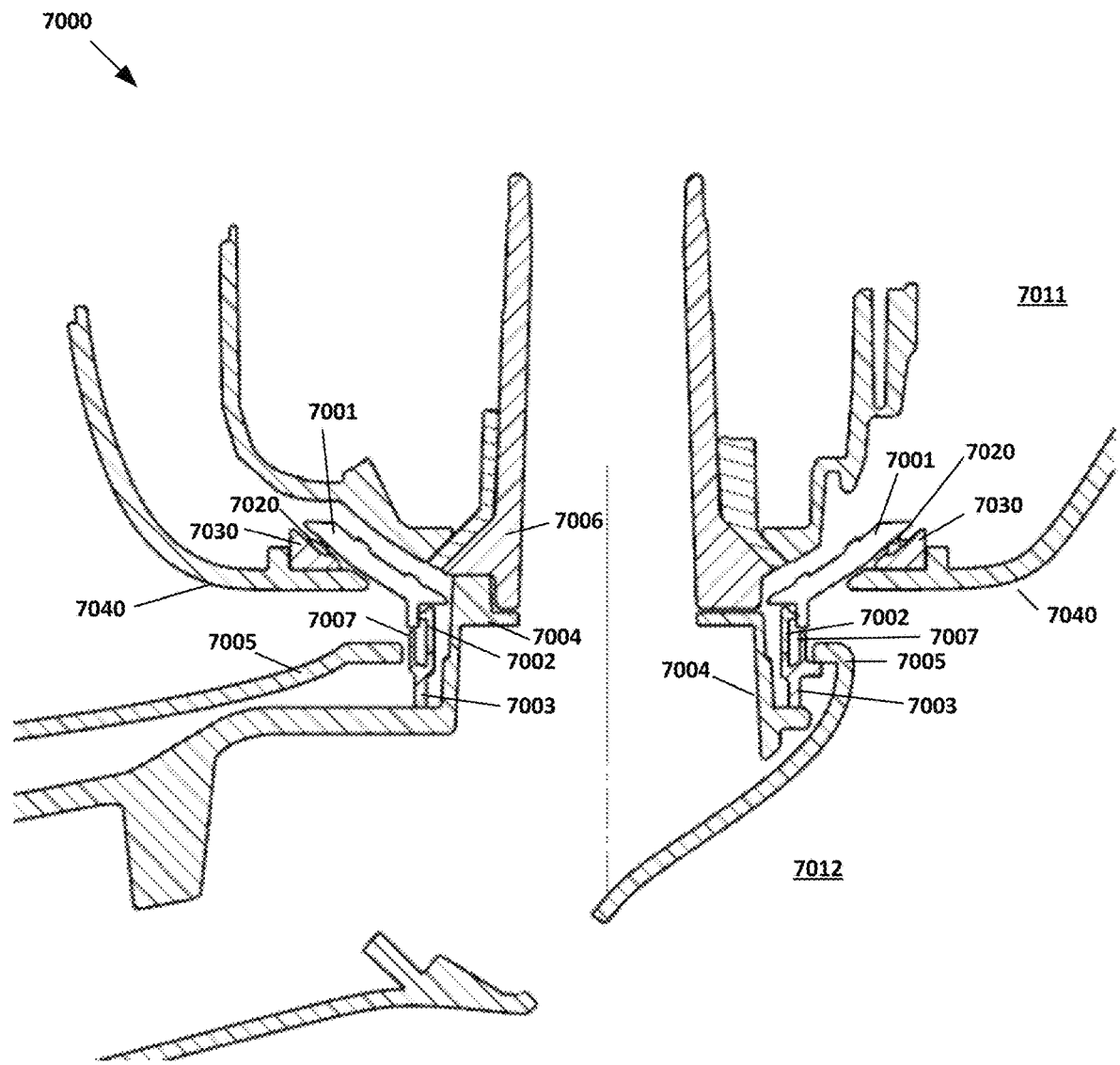
FIGS. 30-32 illustrate a gasket sealing head mover assembly.
Figure 31:
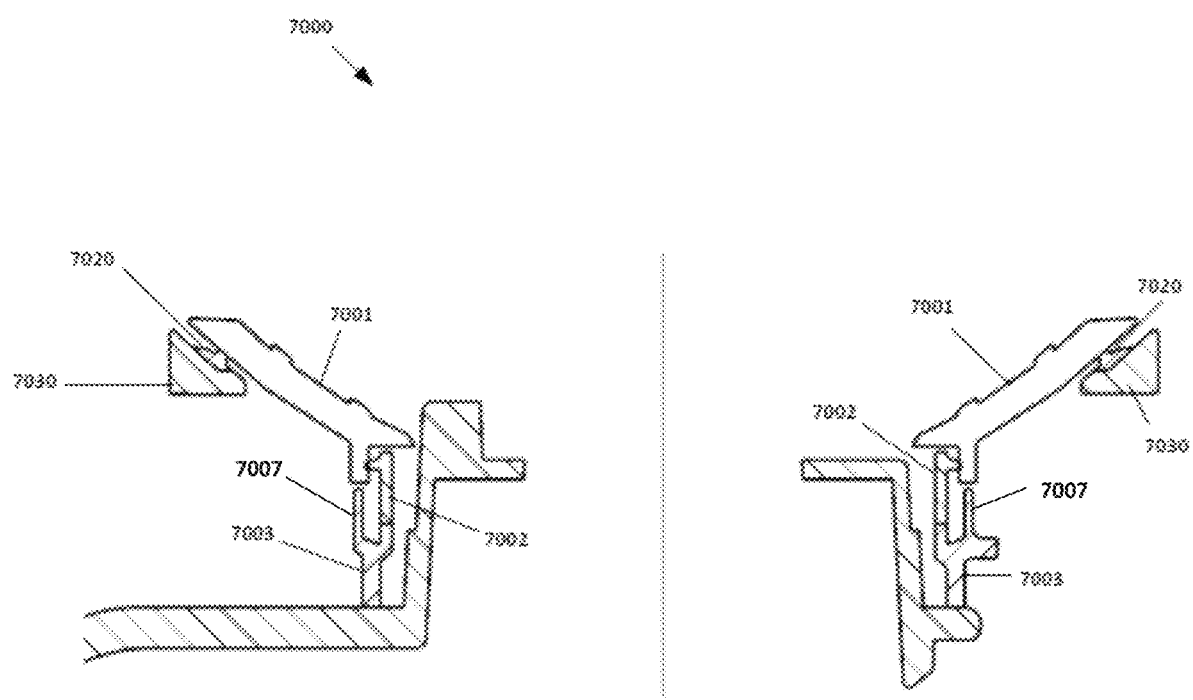
Figure 32:
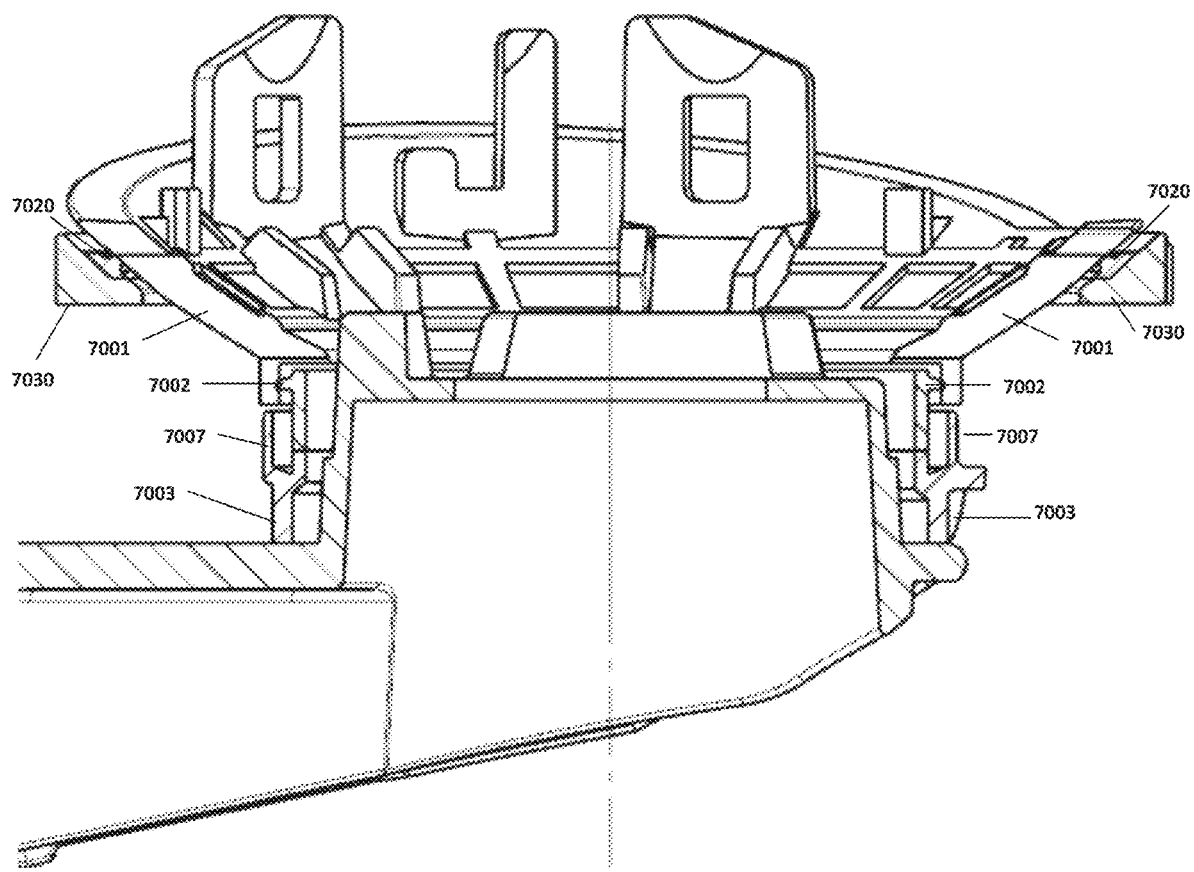

FIGS. 30-32 show a gasket sealing head mover 7000 between a shroud (i.e., an actuator shield) 7001 and a head 7011 and a base 7012 of a rear view device for reducing the influence of a sealing gasket on the consumption of current by the system. With reference to the cut-away view shown in FIG. 30, the gasket sealing head mover 7000 comprises two separate gaskets, a foot gasket 7002, 7003, 7007 and a head gasket 7020, 7030. The head gasket 7020, 7030 provides a seal between the shroud 7001 and the case lower 7040 of the head 7011 of the rear view device, and the foot gasket 7002, 7003, 7007 provides a seal between the shroud 7001 and both the base frame 7004 and the base cover 7005 of the base 7012 of the rear view device. The foot gasket includes a lower hard portion 7003 and two lip portions 7002, 7007. A first lip portion 7007 of the foot gasket extends toward the shroud 7001 in a vertical direction, and a second lip portion 7002 of the foot gasket includes a protrusion that contacts the shroud in a horizontal direction. At least the second lip portion 7002 may be a soft lip made of a flexible material, and in embodiments both the first and second lip portions 7002 and 7007 may be soft lips made of a flexible material. The head gasket incudes a soft lip portion 7020 and a lower hard portion 7030. The soft lip portion 7020 of the head gasket contacts the shroud 7001 in a different direction than the second lip portion 7002 of the foot gasket, and in some embodiments the soft lip portion 7020 of the head gasket extends at about a 45 degree angle from the lower hard portion 7030 to the shroud 7001. In some embodiments, the soft lip portion 7020 of the head gasket extends at an angle dependent on a curvature of the shroud 7001. In some embodiments, the head gasket 7020, 7030 may be omitted.

The lower hard portion 7003 of the foot gasket has a first end with at least one attachment to the base frame 7004 and a second end from which the two lip portions 7002, 7007 extend. In some embodiments, the lip portion 7020 of the head gasket has a first end which makes contact with a face of the shroud 7001. The lip portion 7020 of the head gasket 7020 extends to meet the face of the shroud 7001 at an angle. In some embodiments, the angle is 45 degrees. In some embodiments, the angle is determined by the curvature of the shroud 7001. The soft lip portion 7020 of the head gasket is attached at a second end to the lower hard portion 7030 of the head gasket, and the lower hard portion 7030 of the head gasket rests on and/or is attached to the case lower 7040 of the rear view device. As illustrated, the head gasket 7020, 7030 may be arranged to prevent contact between the shroud 7001 and the case lower 7040 of the rear view device.

The gasket sealing head mover 7000 changes the sealing direction from the common z direction to an x, y direction while reducing the effect of the tolerance stacking of mechanical parts on the gasket while reducing pressure on the rubber lip while maintaining a seal.

The foot gasket 7002, 7003, 7007 and the head gasket 7020, 7030 are further illustrated in FIGS. 31 and 32. FIG. 31 provides a magnified cut-away view of the gasket sealing head mover 7000. FIG. 32 provides a view of the a base assembly with the cut-away views of the foot gasket 7002, 7003, 7007 and the head gasket 7020, 7030.

The rear view device described herein may comprise desired elements not shown in the figures. Desired elements may include a camera module, an indicator module, a light module, a blind side detection module, a blind side indicator, a multi-functional light module, an external light module, an internal light module, a front light, a back light, a fog light, a brake light, an acceleration light, a turn signal, a logo lamp, a front area illumination light, a ground illumination light, a puddle light, a flash light, a navigation light, a position light, an emergency light, a spotlight, a green light, a red light, a warning light, a turn signal light module, an approach light, a search light, an information light, a display, an antenna and/or any combination thereof. Some of the desired elements may also be integrated such that they may operate behind or through a coating such as a partially transparent chromium base coating. An example of a partially transparent chromium based coating for polymeric substrates is described in U.S. patent application Ser. No. 14/936,024, filed on Nov. 9, 2015 for COATED POLYMERIC SUBSTRATES and in U.S. patent application Ser. No. 15/124,310, filed on Feb. 20, 2015 for DECORATIVE COATINGS FOR PLASTIC SUBSTRATES, which are all hereby incorporated herein by reference.

Some of the desired elements may provide an indication signal to a driver of a vehicle equipped with one of the rear view device 102 or the rear view device 104. An example of providing an indication signal to a driver is described in U.S. patent application Ser. No. 16/522,074, filed on Jul. 25, 2019 for AUTOMOBILE EXTERIOR REAR VIEW MIRROR BLIND SPOT WARNING INDICATION DEVICE and in U.S. patent application Ser. No. 15/000,733, filed on Jan. 19, 2016 for LIGHT GUIDING DEVICE, which are all hereby incorporated herein by reference.

In summary, conventional rear view devices provide actuation of components along multiple axes. In order to enable actuation along multiple axes, a second actuator is used which adds engineering and assembly complexity as well as cost to the assembly.

Aspects of the present disclosure provides a system for creating a seal between an actuator and mirror head using a gasket, seal, and shroud. The seal prevents the intrusion of contaminants such as water, dust, salt, or other fluid or debris into the mirror head. The attachment of a mirror head to a mirror base having a gasket creates another seal between the mirror base and shroud in order to and prevent the intrusion of contaminants such as water, dust, salt, or other fluid or debris into the mirror head.

The foregoing description of various variations have been presented for purposes of illustration and description. It is not intended to be exhaustive or to limit the disclosure to the precise forms disclosed, and obviously many modifications and variations are possible in light of the above teaching. The example variations, as described above, were chosen and described in order to best explain the principles of the disclosure and its practical application to thereby enable others skilled in the art to best utilize the disclosure in various variations and with various modifications as are suited to the particular use contemplated.

REFERENCE SIGN LIST

100 Vehicle
102 Rear View Device
104 Rear View Device
202 Axis
204 Mirror Base
206 Mirror Head
208 Line
302 Axis
304 Line
402 Actuator
502 Upper Housing
504 Lower Housing
506 Interleaved Hinge
508 Aperture
510 Tail-Pin
512 Connector
514 Camera Mount
516 Fastener
518 Shroud/spherical Seat
520 Protrusions
522 Guides
524 Clips
526 Guides
528 Fastener
530 Aperture
532 Tilt Axle
534 Foot
536 Aperture
538 Aperture
602 Case lower
604 Aperture
606 First Mount
608 Second Mount
610 Aperture
702 Fastener
802 Case Frame
804 Mount
806 Interleaved Hinge
808 Aperture
810 Web
1102 Cross Section A-A
1104 Point
1106 Point
1102 Spider Frame
1104 Mount
1106 Interleaved Hinge
1108 Aperture
1110 Webs
1112 Aperture
1114 Mount
1116 Aperture
1202 Mount
1302 Bezel Mounted Case Frame
1304 Mount
1306 Interleaved Hinge
1308 Aperture
1310 Webs 1312 Aperture
1314 Mount
1316 Aperture
1318 Mount
1402 Mount
1404 Backing Plate Assembly
1406 Mount
1502 Case Lower
1504 Gasket
1506 Aperture
1508 Guide
1510 At Least One Recess
1512 Attachment Point
1514 At Least One Protrusion
1516 Seal
1602 Actuator
1604 Shroud
1606 Extension
1608 At Least One Aperture
1610A Protrusion
1610B Protrusion
1702 Case Frame cradle
1704 Attachment Point
1706 Attachment Point
1708 Mounting Points
1802 Base Frame
1804 Recess
1806 At Least One Aperture
1808 Protrusion
1810 Aperture
1902 Breakface Gasket
1904 Clip
2302 Upper Base Cover
2304 Lower Base Cover
2402 Shroud
2404 Contact Point
2406 Mirror Head
2408 Actuator
2410 Shaft
2412 Fastener
2414 Base Cover
2416 Contact Point
3408 Actuator
3410 Shaft
3502 Upper Housing
3503 Recess
3504 Recess
3505 Projection
3506 Hinge
3508 Opening
3509 Opening with Thread
3510 Tail Pin
3511 Tilt Bearing Surface
3512 Screw Area
4502 Upper Housing
4503 Recess
4506 Hinge
4508 Opening
4509 Opening with Thread
4510 Tail Pin
4511 Tilt Bearing Surface
4512 Screw Area
5320 Tilt Axle
5380 Aperture
5321 Tapered Portion
5322 Rounded Portion
6060, 6060', 6060" Head Assembly
6060a, 6060"a Upper Cover
6060b, 6060"b Lower Cover
6060c, 6060'c Front Cover
6060"cc Opening
6061 Base Assembly
6061a Bayonet Tower
6075, 6075' Bezel
6085 Camera
6088, 6088' Case Frame
6089 Attachment Means
6097 Gasket
6310 Hard Component
6311 Clips
6312 Clips
6320 Soft Component
7000 Gasket Sealing Head Mover
7001 Shroud
7002 Soft Lip Portion of Foot Gasket
7003 Lower Hard Portion of Foot Gasket
7004 Base Frame
7005 Base Cover Upper
7006 Shaft Dual Actuator
7007 Lip Portion of Foot Gasket
7011 Head of Rear View Device
7012 Base of Rear View Device
7020 Soft Lip Portion of Head Gasket
7030 Hard Portion of Head Gasket
7040 Case Lower

The invention claimed is:

1. A rear view device for a vehicle, said rear view device comprising:
a base adapted to be mounted to a side of the vehicle, wherein said base has a first attachment end disposed at the side of the vehicle and a second attachment end disposed opposite the first attachment end, the base including a base frame and a base cover;
a head for supporting at least one component for providing a rearward field of view to a driver of the vehicle and being disposed at said second attachment end of said base, wherein said head comprises an aperture through which said base can be accessed and a case lower;
an actuator comprising a first attachment component;
a shroud comprising a second attachment component adapted to attach to said first attachment component of the actuator to fixedly attach said shroud to said actuator;
a foot gasket attached to the base frame of the base, the foot gasket including a first lip portion that extends toward the shroud in a vertical direction and a second lip portion that contacts the shroud in a horizontal direction,
wherein the base cover extends toward the first lip such that the foot gasket provides a seal between the shroud, the base frame and the base cover.

2. The rear view device according to claim 1, wherein the second lip portion contacts an inner surface of a vertical extension of the shroud.

3. The rear view device according to claim 1, wherein the second lip portion of the foot gasket is a soft component.

4. The rear view device according to claim 1, further comprising:
a head gasket comprising,
a lip contacting the shroud, and
a hard portion resting on or attaching to the case lower, wherein the head gasket provides a seal between the shroud and the case lower.

5. The rear view device according to claim 4, where the lip of the head gasket contacts an outer surface of the shroud.

6. The rear view device according to claim 4, wherein
the hard component of the head gasket has a cross-section between the case lower and the shroud substantially in the form of a triangle; and
the lip of the head gasket extends from an inclined upper surface of said triangle.

7. The rear view device according to claim 6, wherein the lip of the head gasket extends at an angle of around 90° toward the shroud.

8. The rear view device according to claim 4, wherein a geometry of the head gasket is adapted to a curvature of the shroud.

9. The rear view device according to claim 4, wherein the lip portion of the head gasket is a soft component.

10. The rear view device according to claim 1, further comprising:
a case frame mounted on the base, with the case lower being attached to the case frame;
wherein, the actuator comprises a hinge, and wherein the hinge of the actuator is adapted to be engaged by a complementary hinge provided by the case frame.

11. An exterior rear view device, comprising:
a base adapted to be mounted to a side of the vehicle, the base including a base frame and a base cover;
a head for supporting at least one component for providing a rearward field of view to a driver of the vehicle;
a shroud supported between the base and head; and a foot gasket attached to the base frame of the base, the foot gasket comprising,
a first lip that extends toward the shroud in a vertical direction, and
a second lip that contacts the shroud in a horizontal direction,
wherein the base cover of the base extends towards the first lip such that the foot gasket provides a seal between the shroud, the base frame and the base cover.

12. The exterior rear view device according to claim 11, further comprising:
a head gasket comprising,
a soft lip portion comprising a first end making contact with a face of the shroud, and
a hard portion comprising an attachment to a second end of the soft lip portion;
wherein the head gasket extends at an angle from the shroud.

13. The exterior rear view device according to claim 11, wherein the head gasket extends at an angle of about 45 degrees from the shroud.

14. The exterior rear view device according to claim 11, wherein the head gasket extends at an angle dependent on a curvature of the shroud.

15. A vehicle with at least one rear view device of claim 1 or 11.

* * * * *